(12) United States Patent
Tokuchi

(10) Patent No.: US 10,810,915 B2
(45) Date of Patent: Oct. 20, 2020

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 127 days.

(21) Appl. No.: 16/053,484

(22) Filed: Aug. 2, 2018

(65) Prior Publication Data
US 2019/0228689 A1   Jul. 25, 2019

(30) Foreign Application Priority Data
Jan. 23, 2018  (JP) .................. 2018-009008

(51) Int. Cl.
| | |
|---|---|
| *G06T 7/90* | (2017.01) |
| *G06T 11/00* | (2006.01) |
| *G09G 3/22* | (2006.01) |
| *G09G 3/00* | (2006.01) |
| *G06T 11/60* | (2006.01) |
| *G09G 3/20* | (2006.01) |

(52) U.S. Cl.
CPC .............. *G09G 3/002* (2013.01); *G06T 7/90* (2017.01); *G06T 11/001* (2013.01); *G06T 11/60* (2013.01); *G09G 3/2003* (2013.01); *G09G 3/22* (2013.01); *G06T 2207/10032* (2013.01); *G06T 2207/30188* (2013.01); *G09G 2320/0242* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 9,569,815 B1* | 2/2017 | Abuelsaad | G06T 3/40 |
| 9,778,738 B2 | 10/2017 | Sugimoto et al. | |
| 2011/0261260 A1* | 10/2011 | Gruen | H04N 5/275 348/575 |
| 2012/0057006 A1* | 3/2012 | Joseph | H04N 13/395 348/59 |
| 2014/0368525 A1* | 12/2014 | Faaborg | G09G 5/02 345/589 |
| 2018/0186247 A1* | 7/2018 | Sychov | B60L 11/1846 |
| 2018/0252934 A1* | 9/2018 | Kim | G02B 30/25 |
| 2018/0288359 A1* | 10/2018 | Komatsu | G02B 27/0172 |

FOREIGN PATENT DOCUMENTS

| | | |
|---|---|---|
| JP | 2013-109421 A | 6/2013 |
| JP | 2014-157482 A | 8/2014 |
| JP | 2017-062709 A | 3/2017 |

* cited by examiner

*Primary Examiner* — Aaron M Richer
(74) *Attorney, Agent, or Firm* — Oliff PLC

(57) ABSTRACT

An information processing apparatus includes a controller that improves visibility of a first image. The first image is formed in the air by using a first image forming unit.

25 Claims, 38 Drawing Sheets

L1 > L0

TIME POINT: T1

TIME POINT: T2

TIME POINT: T1

TIME POINT: T2

AREA OF 11

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-009008 filed Jan. 23, 2018.

BACKGROUND

(i) Technical Field

The present invention relates to an information processing apparatus, an information processing system, and a non-transitory computer readable medium.

(ii) Related Art

A technique is known in which beams are made to cross each other in the air so that an image is formed at the intersection point of the beams. An image displayed by using this type of technique is also called an aerial image.

SUMMARY

According to an aspect of the invention, there is provided an information processing apparatus including a controller that improves visibility of a first image. The first image is formed in the air by using a first image forming unit.

BRIEF DESCRIPTION OF THE DRAWINGS

Exemplary embodiments of the present invention will be described in detail based on the following figures, wherein.

DETAILED DESCRIPTION

Figure 1:
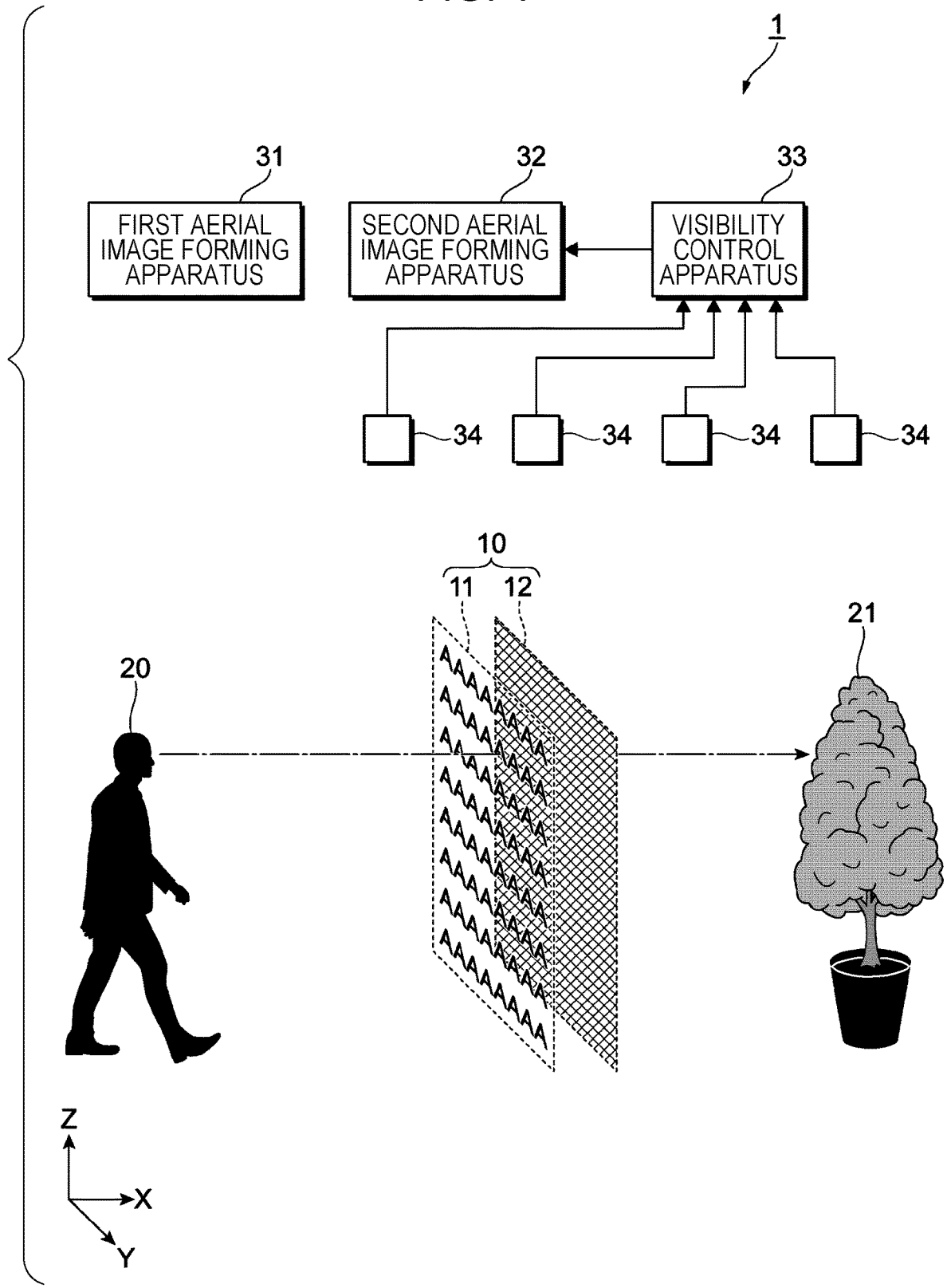
FIG. 1 is a diagram describing the schematic configuration of an aerial image forming system according to a first exemplary embodiment.

By referring to the drawings, exemplary embodiments of the present invention will be described below.

First Exemplary Embodiment

Schematic Configuration of an Aerial Image Forming System

FIG. 1 is a diagram describing the schematic configuration of an aerial image forming system 1 according to a first exemplary embodiment.

In the first exemplary embodiment, an aerial image 10 is an image formed in the air in such a manner that the state of light equivalent to reflected light from an object is reproduced. The aerial image 10 is formed as if floating in the air. Therefore, a person may go through the aerial image 10.

In the first exemplary embodiment, the case in which two aerial images 10 are formed in a single space is assumed.

In the first exemplary embodiment, one of the images is called an aerial image 11, and the other is called an aerial image 12.

A guide screen or an advertisement screen is displayed on the aerial image 11. An operation screen whose display is changed in accordance with operations performed by a person 20 may be displayed on the aerial image 11. However, the displayed screen is not limited to a guide screen, an advertisement screen, or an operation screen.

As the aerial image 11, not only a still image but also a moving image may be displayed.

In the exemplary embodiments, the entire rectangle is regarded as an aerial image 10. However, the shape defining the fringe of an aerial image 10 is not limited to a rectangle, and may be any shape. For example, a space in which an image of an object is formed may be regarded as the entire space in which an aerial image 10 is formed. For example, an operation button image, a person image, an animal image, a product image, and a fruit image may be also examples of an aerial image 10. In FIG. 1, an aerial image 10 has a planar shape. However, an aerial image 10 may have a three dimensional shape, such as a curved surface, a ball, or a cube.

The aerial image 11 is not real although being recognized visually. Therefore, visibility may be decreased in a portion in which the aerial image 11 overlies a background (for example, a potted plant 21). For example, when the color tone of characters used in the display of the aerial image 11 is close to the color tone of the potted plant 21, the characters are difficult to recognize.

In the first exemplary embodiment, the aerial image 12 is used in order to suppress reduction in the visibility of the aerial image 11. In other words, the aerial image 12 is used in order to improve the visibility of the aerial image 11.

Accordingly, in the example in FIG. 1, the aerial image 12 is disposed behind the aerial image 11 when viewed by the person 20.

In FIG. 1, the area of a space in which the aerial image 11 is formed is approximately the same as the area of a space in which the aerial image 12 is formed. A gap is provided between the space in which the aerial image 11 is formed and the space in which the aerial image 12 is formed. In FIG. 1, the gap between the aerial image 11 and the aerial image 12 is constant.

The arrangement of the aerial image 12 in FIG. 1 is an example in which the aerial image 12 is disposed near the aerial image 11.

If an effect of improving the visibility is obtained, the width of the gap and the position at which the aerial image 12 is disposed may be any. Concrete examples will be described below.

The aerial image 11 is an exemplary first image, and the aerial image 12 is an exemplary second image.

The aerial image forming system 1 according to the first exemplary embodiment includes an aerial image forming apparatus 31, an aerial image forming apparatus 32, a visibility control apparatus 33, and human detection sensors 34. The aerial image forming apparatus 31 forms the aerial image 11 in the air. The aerial image forming apparatus 32 forms the aerial image 12 in the air. The visibility control apparatus 33 controls formation of the aerial image 12. The human detection sensors 34 detect the person 20 who is present in a space in which the aerial image 11 is formed.

In FIG. 1, to discriminate the aerial image forming apparatus 31 from the aerial image forming apparatus 32, the aerial image forming apparatus 31 is designated as a first aerial image forming apparatus, and the aerial image forming apparatus 32 is designated as a second aerial image forming apparatus.

In FIG. 1, the multiple human detection sensors 34 are disposed around the space in which the aerial image 11 is formed. As a human detection sensor 34, for example, a heat sensor that detects heat of a person, a current collecting sensor that detects infrared radiation emitted from a human body, a photo sensor that detects an object crossing light, an acoustic wave sensor that detects an object through audio reaction, a sensor that detects a weight added on a floor or a mat, or an imaging camera is used.

The aerial image forming system 1 is an exemplary information processing system. The visibility control apparatus 33 is an exemplary controller. The aerial image forming apparatuses 31 and 32 are exemplary image forming units. The aerial image forming apparatus 31 is also an exemplary first image forming unit. The aerial image forming apparatus 32 is also an exemplary second image forming unit.

The visibility control apparatus 33 controls formation of the aerial image 12 on the basis of the positional relationship between the aerial image 11 and the person 20, and controls a view of the aerial image 11 from the person 20 (visibility). This is because a view of a background through the aerial image 11 changes depending on the position at which the person 20 stands relative to the aerial image 11.

The visibility control apparatus 33 according to the first exemplary embodiment obtains information about the position of the person 20 through the human detection sensors 34. The information about the position of the person 20 is exemplary information about the environment around the aerial image 11.

The information necessary for the control is not limited to the position at which the person 20 stands. For example, even when a person is present near the aerial image 11, if the person just passes in front of the aerial image 11 or if the person does not look at the aerial image 11, there is little necessity of controlling formation of the aerial image 12 to improve the visibility of the aerial image 11. Therefore, it is desirable that information about actions of the person 20 (for example, the direction of move, and the direction of the line of sight) be also used in control of the aerial image 12 which is exerted by the visibility control apparatus 33.

The state in which a background is viewed through an aerial image is sometimes desirable in terms of the visibility. For example, a white wall, floor, or ceiling is good for checking the color of the aerial image 11. For example, a black or brown wall, floor, or ceiling is good for checking the aerial image 11 because the brightness of the aerial image 11 is emphasized. For example, in the case where the color tone of the background side of the aerial image 11 is the opposite color of the color tone used in the display of the aerial image 11, the background color is good for improving the visibility of the aerial image 11.

Exemplary Aerial Image Forming Apparatuses

By using FIGS. 2A to 6, the principles of forming the aerial images 11 and 12 will be described. The principles described below are known.

In the first exemplary embodiment, the configuration of the aerial image forming apparatus 31 which forms the aerial image 11 is common to the configuration of the aerial image forming apparatus 32. Therefore, in FIGS. 2A to 6, the configuration of the aerial image forming apparatus 31 is illustrated.

The principle used by the aerial image forming apparatus 31 may be different from the principle used by the aerial image forming apparatus 32.

Figure 2A:
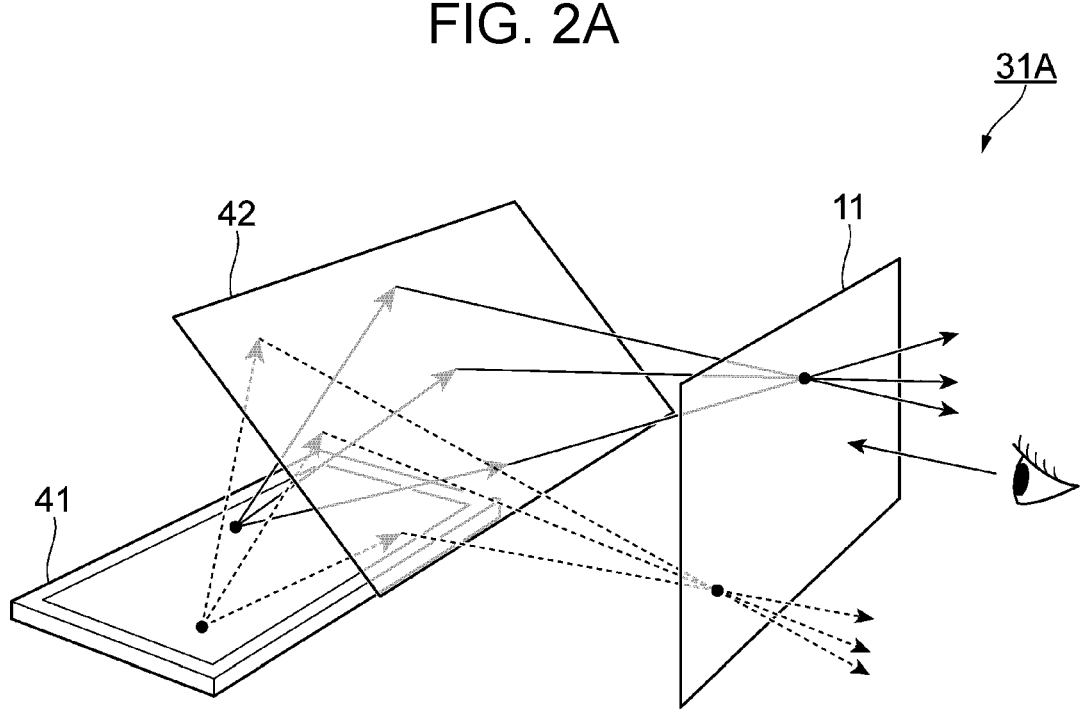
FIG. 2A is diagram describing the principle of an aerial image forming apparatus that forms an aerial image by transmitting, through a dedicated optical plate, light that is output from a display device, and illustrating the positional relationship between each component and the aerial image.
Figure 2B:
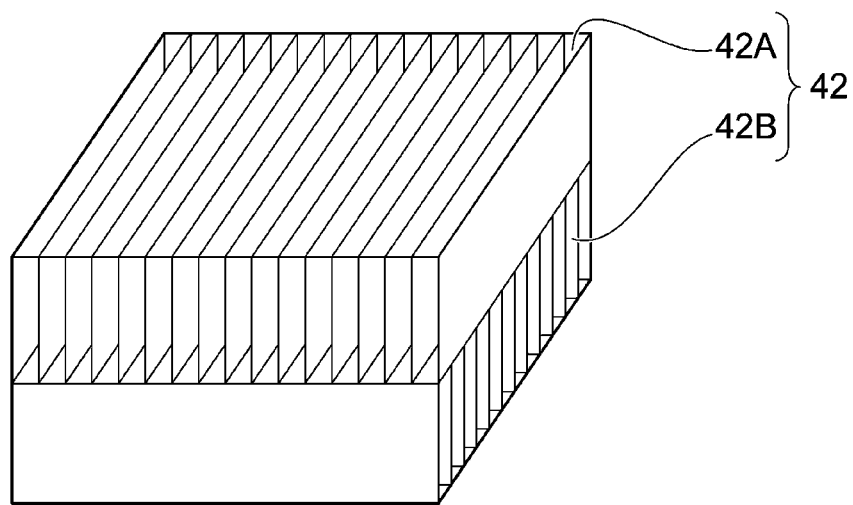
FIG. 2B is a diagram illustrating a portion of the cross section structure of the optical plate in FIG. 2A.

FIGS. 2A and 2B are diagrams describing the principle of an aerial image forming apparatus 31A that forms the aerial image 11 by transmitting, through a dedicated optical plate 42, light that is output from a display device 41. FIG. 2A illustrates the positional relationship between each component and the aerial image 11. FIG. 2B illustrates a portion of the cross section structure of the optical plate 42. The display device 41 and the optical plate 42 are exemplary optical components.

The optical plate 42 has a structure in which a first plate is stacked on top of a second plate. In the first plate, strip glass 42A whose wall surface is used as a mirror is arranged. In the second plate, strip glass 42B is arranged in the direction orthogonal to the glass 42A.

The optical plate 42 causes light, which is output from the display device 41, to be reflected twice, for formation of an image, on the strip glass 42A and the strip glass 42B. Thus, an image displayed on the display device 41 is reproduced in the air. The distance between the display device 41 and the optical plate 42 is the same as the distance between the optical plate 42 and the aerial image 11. The size of an image displayed on the display device 41 is the same as the size of the aerial image 11.

Figure 3:
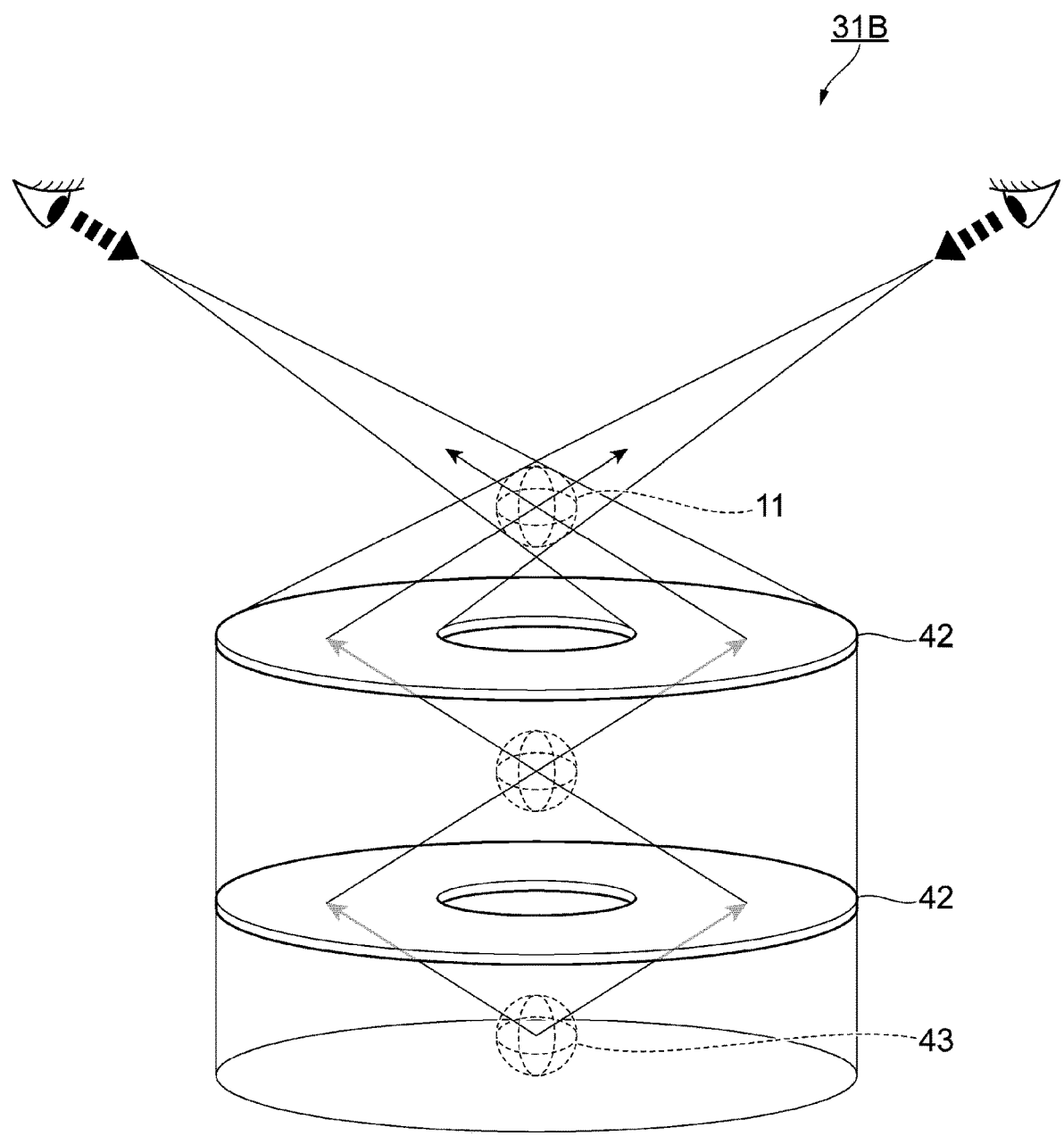
FIG. 3 is a diagram describing the principle of an aerial image forming apparatus that forms a three dimensional image as an aerial image.

FIG. 3 is a diagram describing the principle of an aerial image forming apparatus 31B forming a three dimensional image as the aerial image 11. The aerial image forming apparatus 31B causes light, which is reflected from the surface of a real object 43, to be transmitted twice through optical ring plates 42. Thus, the aerial image forming apparatus 31B reproduces a three dimensional image (the aerial image 11) in the air. The optical plates 42 are not necessarily arranged in series.

Figure 4A:
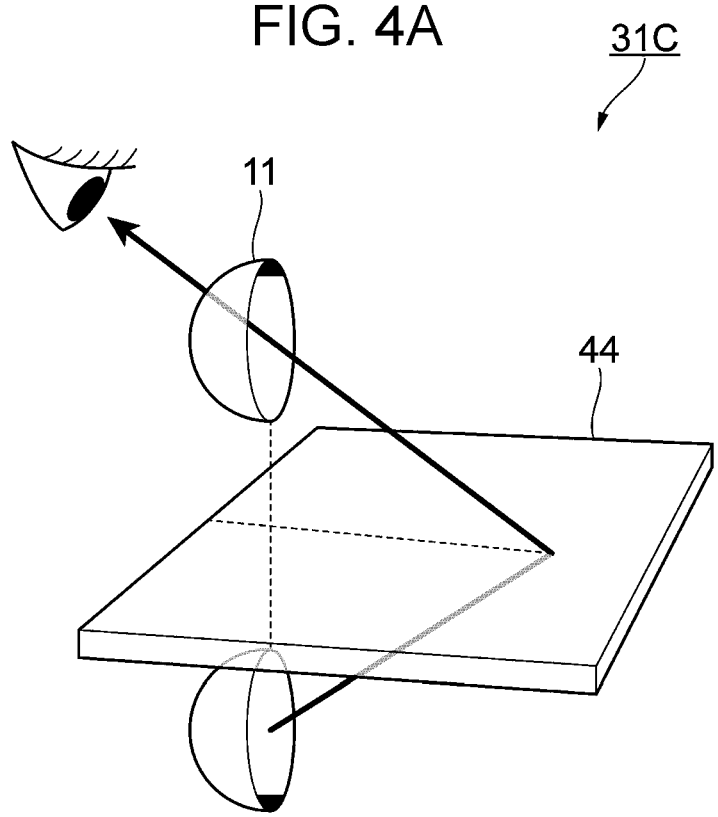
FIG. 4A is a diagram describing the principle of an aerial image forming apparatus that forms an aerial image by using a micromirror array having a structure in which fine square holes forming a dihedral corner reflector are arranged at equal intervals in a flat surface, and illustrating the positional relationship between each component and the aerial image.
Figure 4B:
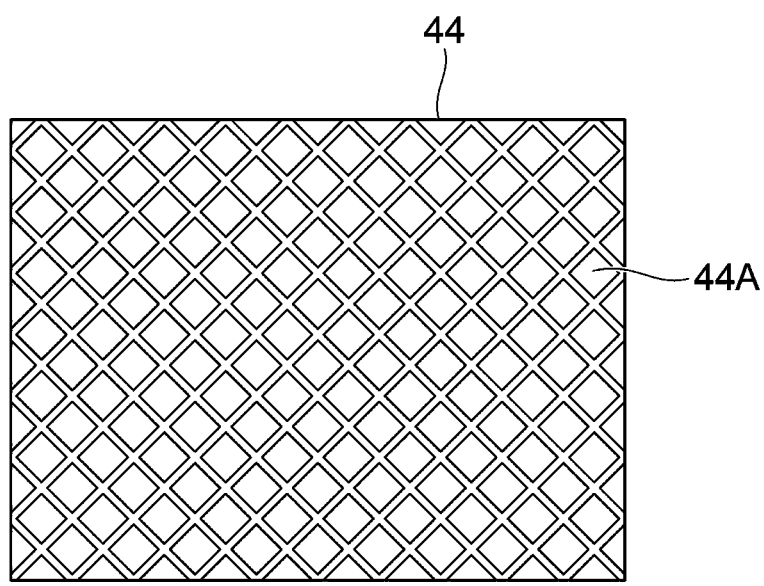
FIG. 4B is an enlarged view of a portion of the micromirror array in FIG. 4A.

FIGS. 4A and 4B are diagrams describing the principle of an aerial image forming apparatus 31C that forms the aerial image 11 by using a micromirror array 44. The micromirror array 44 has a structure in which fine square holes 44A, which form a dihedral corner reflector, are arranged at equal intervals in a flat surface. FIG. 4A illustrates the positional relationship between each component and the aerial image 11, and FIG. 4B is an enlarged view of a portion of the micromirror array 44. Each hole 44A is, for example, about 100 μm square. The micromirror array 44 is an exemplary optical component.

Figure 5:
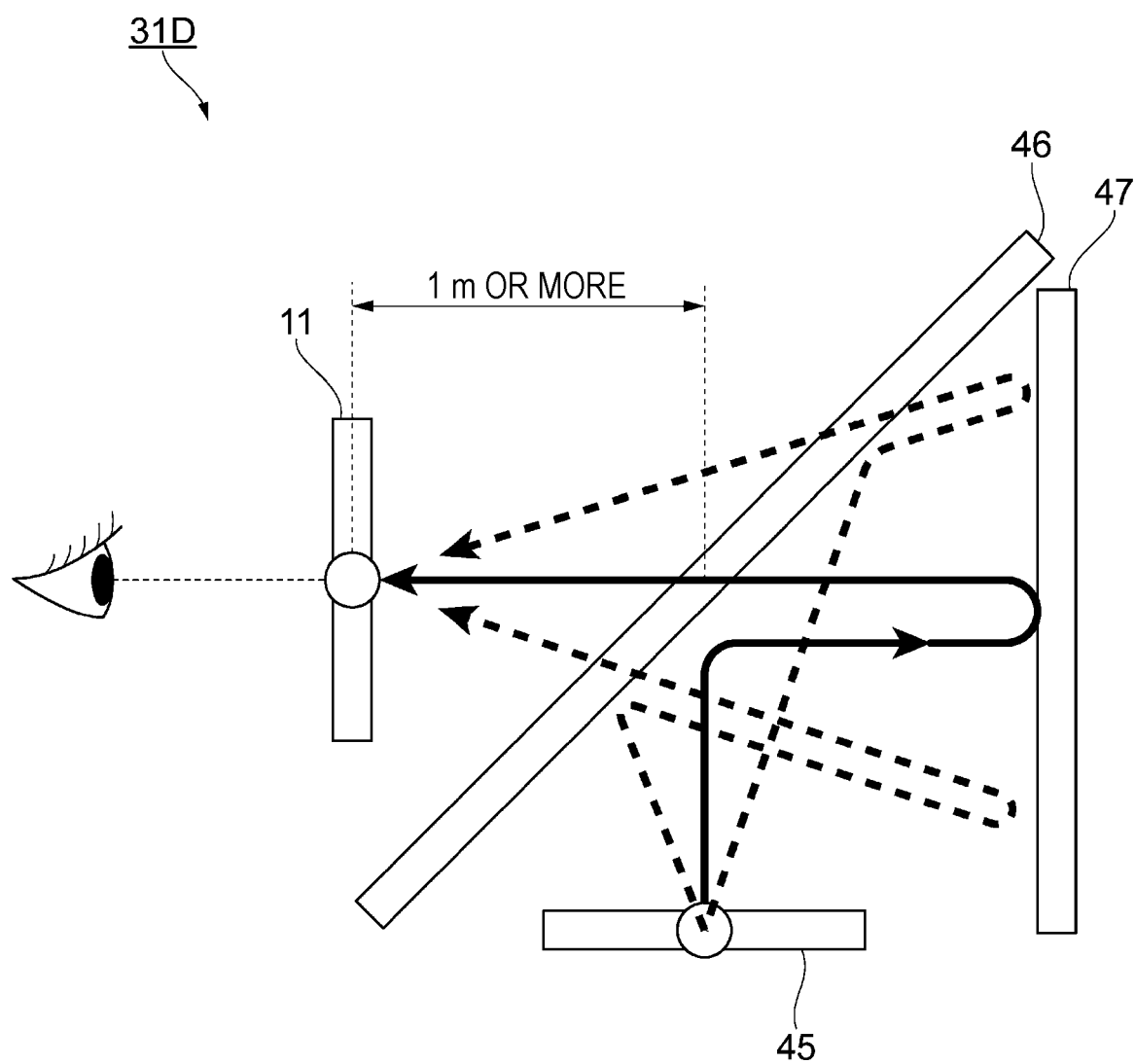
FIG. 5 is a diagram describing the principle of an aerial image forming apparatus using a beam splitter and a retro-reflective sheet.

FIG. 5 is a diagram describing the principle of an aerial image forming apparatus 31D using a beam splitter 46 and a retro-reflective sheet 47. The beam splitter 46 is disposed at an angle of 45° with respect to the display surface of a display device 45. The retro-reflective sheet 47 is disposed at an angle of 90° with respect to the display surface of the display device 45 on the side of the reflection of a display image from the beam splitter 46. The display device 45, the beam splitter 46, and the retro-reflective sheet 47 are exemplary optical components.

In the case of the aerial image forming apparatus 31D, light that is output from the display device 45 is reflected by the beam splitter 46 in the direction directed to the retro-reflective sheet 47. Then, the light is retroreflected by the retro-reflective sheet 47, and is transmitted through the beam splitter 46, forming an image in the air. The aerial image 11 is formed at a position at which the light forms an image.

Figure 6:
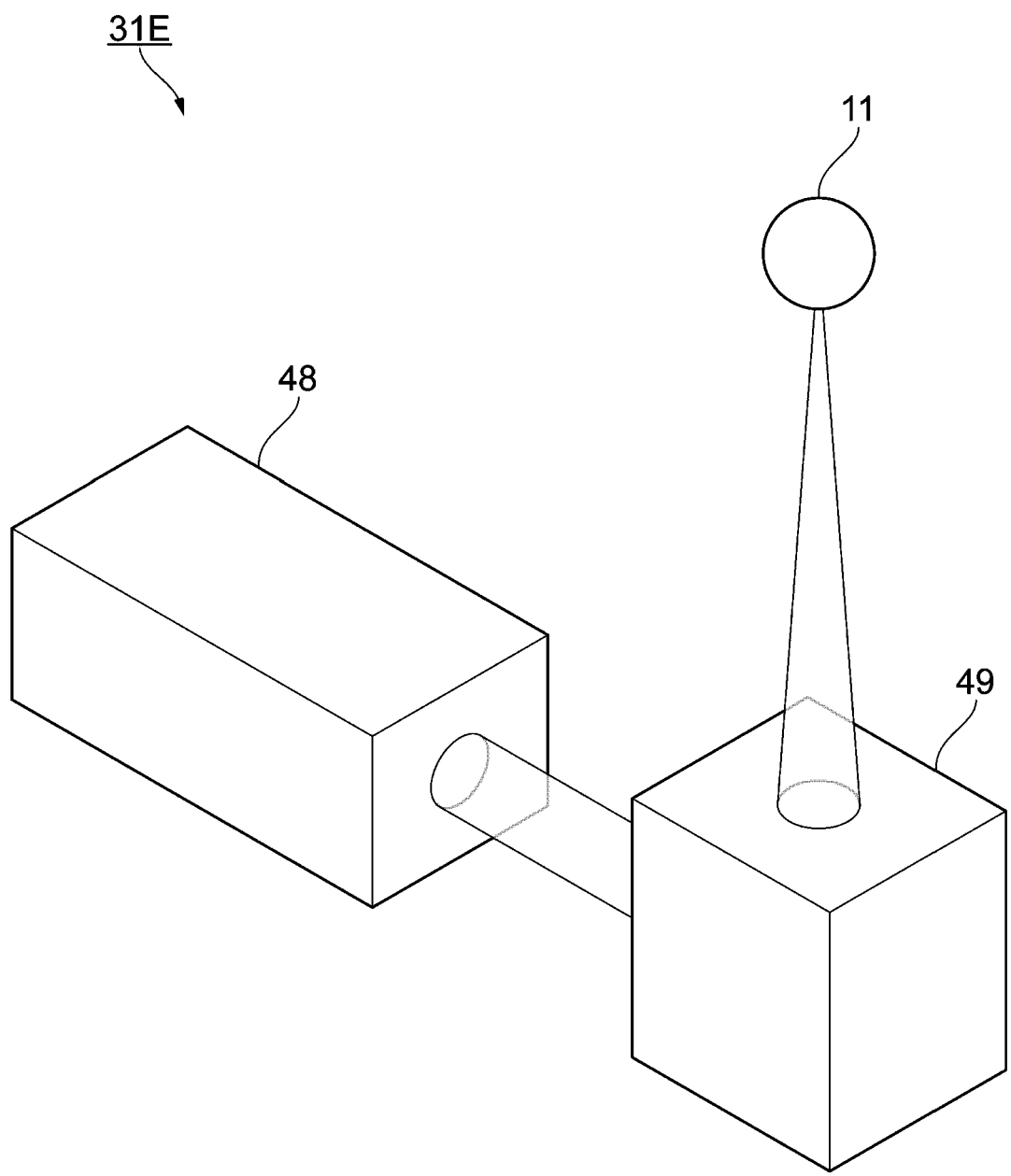
FIG. 6 is a diagram describing the principle of an aerial image forming apparatus that forms an aerial image as a set of plasma emissions.

FIG. 6 is a diagram describing the principle of an aerial image forming apparatus 31E that forms the aerial image 11 as a set of plasma emissions.

In the case of the aerial image forming apparatus 31E, an infrared pulse laser 48 outputs pulse laser beams, and an XYZ scanner 49 concentrates the pulse laser beams in the air. At that time, gas around the focus is instantaneously plasmarised, and emits light. The pulse frequency is, for example, 100 Hz or less. The pulse emission time is, for example, of the nanosecond order. The infrared pulse laser 48 and the XYZ scanner 49 are exemplary optical components.

Configuration of the Visibility Control Apparatus 33

Figure 7:
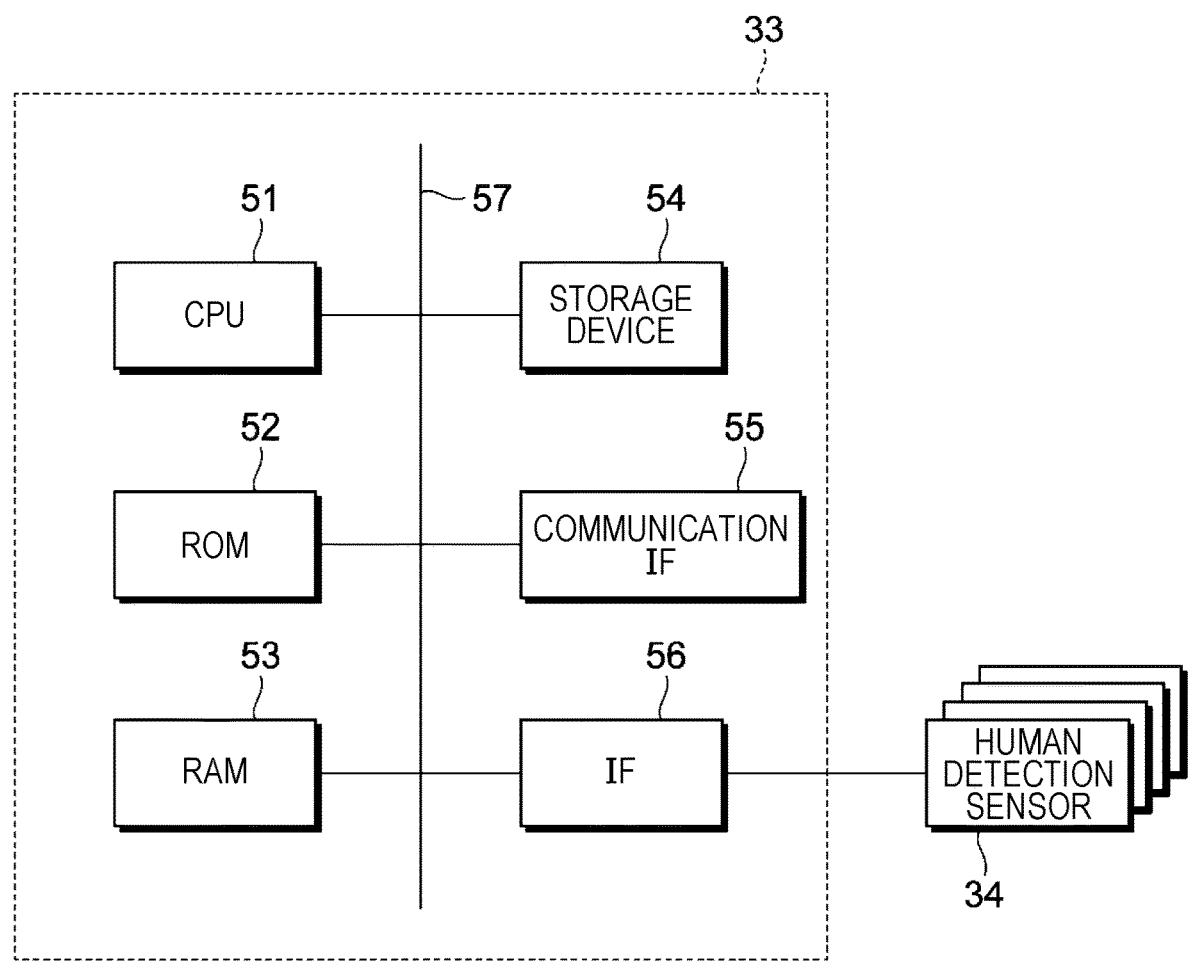
FIG. 7 is a diagram describing an exemplary hardware configuration of a visibility control apparatus according to the first exemplary embodiment.

FIG. 7 is a diagram describing an exemplary hardware configuration of the visibility control apparatus 33 according to the first exemplary embodiment.

The visibility control apparatus 33 includes a central processing unit (CPU) 51 that provides various functions through execution of firmware and application programs, a read only memory (ROM) 52 that is a storage area storing the firmware and a basic input output system (BIOS), and a random access memory (RAM) 53 that is an area in which programs are executed. The CPU 51, the ROM 52, and the RAM 53 are exemplary so-called computers.

The visibility control apparatus 33 also includes a storage device 54 storing information displayed in the aerial image 12. The storage device 54 uses, for example, a rewritable nonvolatile recording medium for storage of information.

The visibility control apparatus 33 controls the aerial image forming apparatus 32 by using a communication interface (communication IF) 55, and changes formation of the aerial image 12. The control encompasses, for example, whether or not the aerial image 12 is formed, the position at which the aerial image 12 is formed, the size of the aerial image 12, and display content of the aerial image 12.

The visibility control apparatus 33 communicates with the human detection sensors 34 by using an interface (IF) 56.

The CPU 51 is connected to the units through a bus 57.

Figure 8:
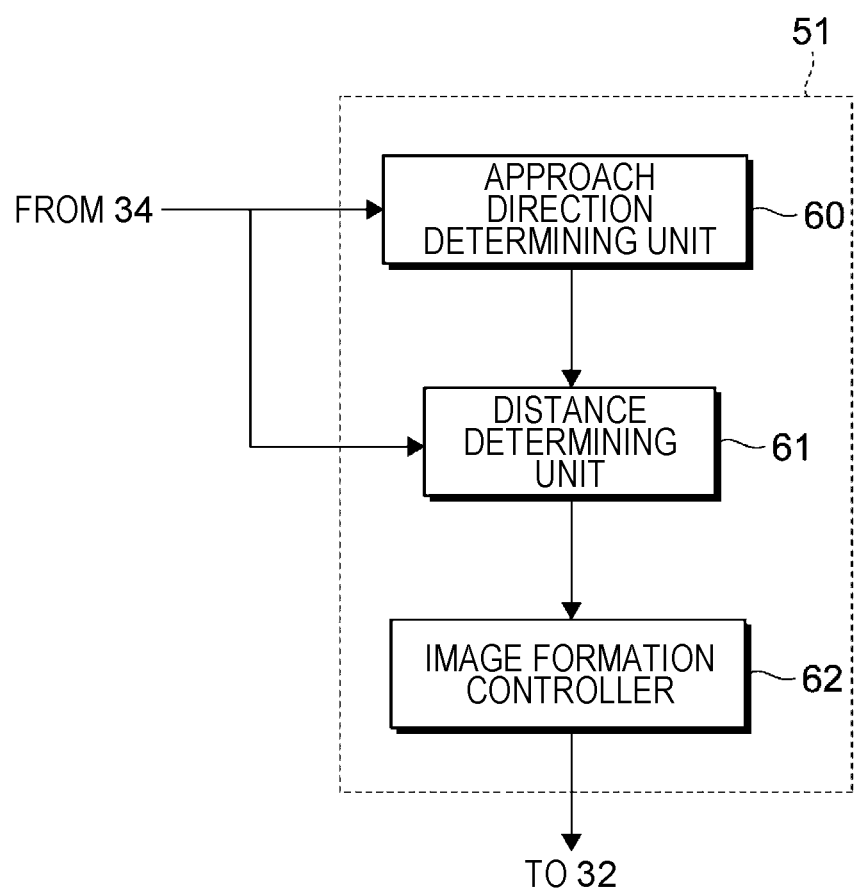
FIG. 8 is a diagram describing an exemplary functional configuration of the visibility control apparatus according to the first exemplary embodiment.

FIG. 8 is a diagram describing an exemplary functional configuration of the visibility control apparatus 33 (see FIG. 7) according to the first exemplary embodiment.

The functional configuration illustrated in FIG. 8 is implemented through the CPU 51 (see FIG. 7) executing programs.

The CPU 51 functions as an approach direction determining unit 60, a distance determining unit 61, and an image formation controller 62. The approach direction determining unit 60 determines the direction in which the person 20 approaches the aerial image 11 (see FIG. 1). The distance determining unit 61 determines the distance between the aerial image 11 and the person 20. The image formation controller 62 controls formation of the aerial image 12 on the basis of the determination results of the approach direction and the distance.

The approach direction determining unit 60 and the distance determining unit 61 are exemplary determination units.

In the first exemplary embodiment, the approach direction determining unit 60 and the distance determining unit 61 calculate the approach direction and the distance on the basis of signals that are output from the human detection sensors 34.

For example, in the case where the human detection sensors 34 are imaging cameras, one of the following methods may be employed: a method of obtaining the distance by using parallax from two images obtained through stereo imaging using two imaging cameras; and a method of determining the distance by using a single imaging camera to capture an image in which blurs and color shifts occur in accordance with the distance to the person 20 and by performing image processing on the blurs and the color shifts. In the case where imaging cameras are used, multiple captured images (including a moving image) may be subjected to image processing to obtain the approach direction.

For example, when the human detection sensors 34 are sensors other than imaging cameras, the distance may be obtained from the mounting position of a human detection sensor 34 having detected the person 20, and the approach direction may be obtained from the relationship among the mounting positions of multiple human detection sensors 34 having detected the person 20.

The image formation controller 62 according to the first exemplary embodiment controls formation of the aerial image 12 on the basis of the determination results of the approach direction and the distance. Various control methods may be employed in accordance with the operation policy of the aerial image 11 defined by a business operator or the like.

For example, when the person 20 is not present in a range of a predetermined distance from the aerial image 11, it is possible not to form the aerial image 12.

For example, when the person 20 goes away from the aerial image 11, it is possible not to form the aerial image 12.

For example, the position at which the aerial image 12 is formed, the size, and the display content may be changed in accordance with the display content of the aerial image 11 and a change of the display content.

For example, the position at which the aerial image 12 is formed, the size, and display content may be changed in accordance with a background viewed through the aerial image 11 from the person 20.

A change in the position at which the aerial image 12 is formed encompasses, for example, a translation of the aerial image 12, a rotation of the aerial image 12, a reduction in the screen size of the aerial image 12, or a combination of these.

The display of the aerial image 12 may be a color, a pattern, a design, or the like which improves the visibility of the aerial image 11 or which reduces the visibility of a background.

For example, the entire aerial image 12 is displayed in a monochrome color (including a chromatic color as well as an achromatic color).

For example, an opposite color (complementary color) to the color tone of characters and images used in the display of the aerial image 11 may be assigned to the aerial image 12. Opposite colors indicate colors located at opposite positions on the hue circle. For example, green colors to dark blue colors are opposite to red, or bluish green colors to purple are opposite to orange. Use of opposite colors facilitates recognition of characters and images displayed in the aerial image 11. In this case, the color tone of the aerial image 12 partially changes.

For example, the aerial image 12 has a color tone having a visual effect for improving the contrast to the aerial image 11. A uniform color may be applied to the entire aerial image 12, or uniform colors may be applied to respective portions of the aerial image 12.

For example, the aerial image 12 is displayed with a pattern or a design exerting an effect of masking a background. The pattern and the design may be a repetitive pattern such as grids, or may be a random pattern.

For example, in the aerial image 12, a portion corresponding to the inside of the aerial image 11 may be displayed with a color tone, and a portion corresponding to the outside of the aerial image 11 may be displayed with a different color tone. Thus, the fringe of the aerial image 11 may be emphasized. That is, the aerial image 12 may be used as a so-called frame.

Operations Performed by the Image Formation Controller

Figure 9:
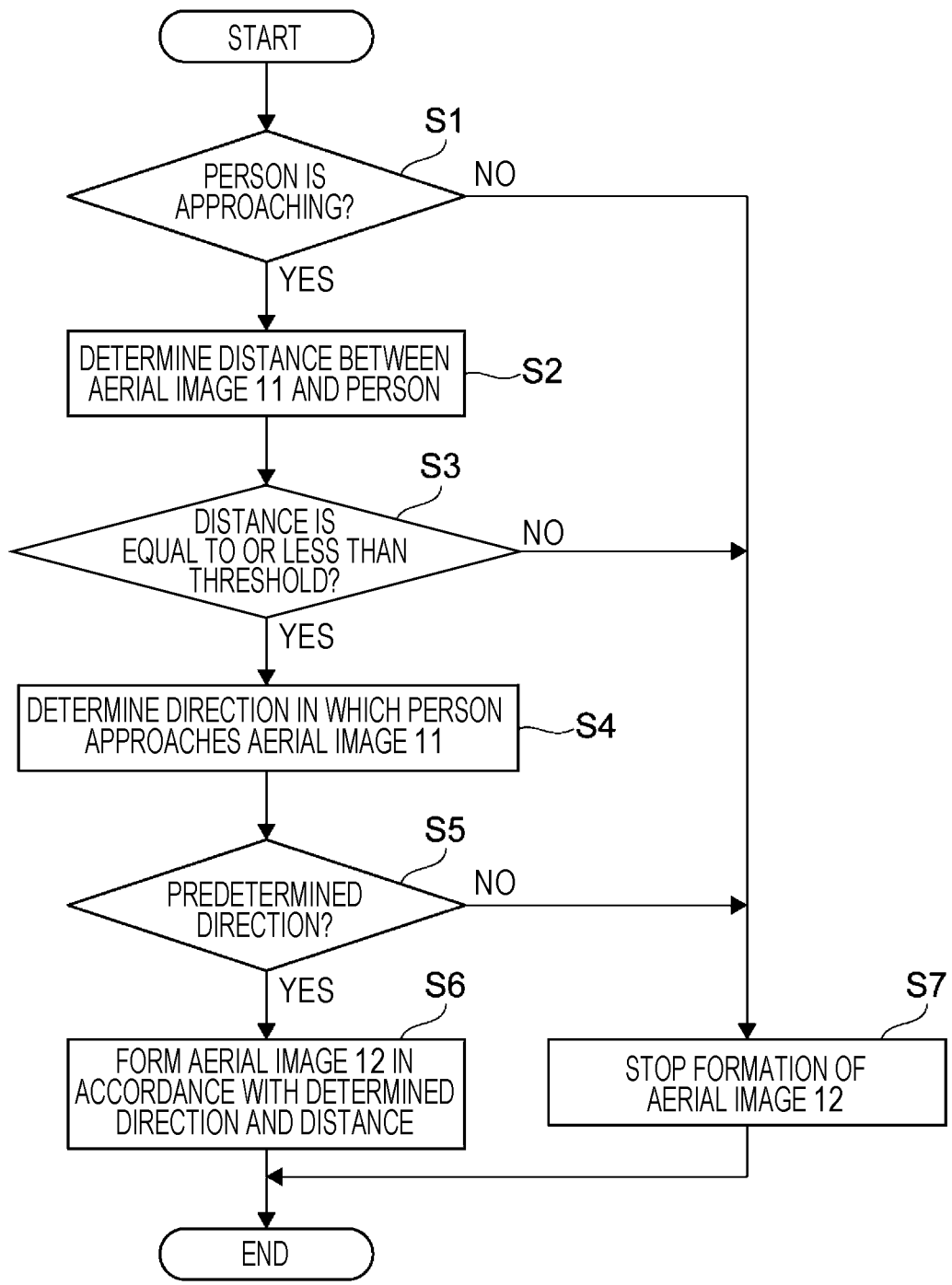
FIG. 9 is a flowchart describing an overview of operations performed by an image formation controller.

FIG. 9 is a flowchart describing an overview of operations performed by the image formation controller 62 (see FIG. 8). An overview will be described. Accordingly, details are different depending on individual usage.

The image formation controller 62 determines whether or not a person is approaching (step 1).

If the determination result is negative in step 1, the image formation controller 62 stops formation of the aerial image 12 (step 7). Alternatively, until an approaching person is detected, the determination in step 1 may be repeatedly performed, or the process may end.

If the determination result is positive in step 1, the image formation controller 62 determines the distance between the aerial image 11 and the person (step 2).

The image formation controller 62 determines whether or not the determined distance is equal to or less than a threshold (step 3). The threshold is predetermined. The threshold may be given as an initial value, or may be changed after start of the operation.

If the determination result is negative in step 3, the image formation controller 62 stops formation of the aerial image 12 (step 7). Also in this case, the process may return to the determination in step 1, or may end.

If the determination result is positive in step 3, the image formation controller 62 determines the direction in which the person approaches the aerial image 11 (step 4).

The image formation controller 62 determines whether or not the determined direction matches a predetermined direction (step 5). The predetermined direction is such that, when the determined direction matches a predetermined direction, the aerial image 12 is desirably formed to improve the visibility of the aerial image 11. The predetermined direction is set, for example, to a direction toward the front of the aerial image 11.

If the determination result is negative in step 5, the image formation controller 62 stops formation of the aerial image 12 (step 7). For example, this corresponds to the case in which the person is located on the side of the aerial image 12. Even in this case, the process may return to the determination in step 1, or may end.

If the determination result is positive in step 5, the image formation controller 62 causes the aerial image forming apparatus 32 to form the aerial image 12 in accordance with the determined direction and distance (step 6).

Desirably, the image formation controller 62 controls the content of the aerial image 12, which is to be formed, in consideration of information about the display content of the aerial image 11 and a background of the aerial image 11.

Examples of formation of the aerial image 12 will be described below.

Examples of Formation of the Aerial Image 12

First Formation Example

Figure 10A:
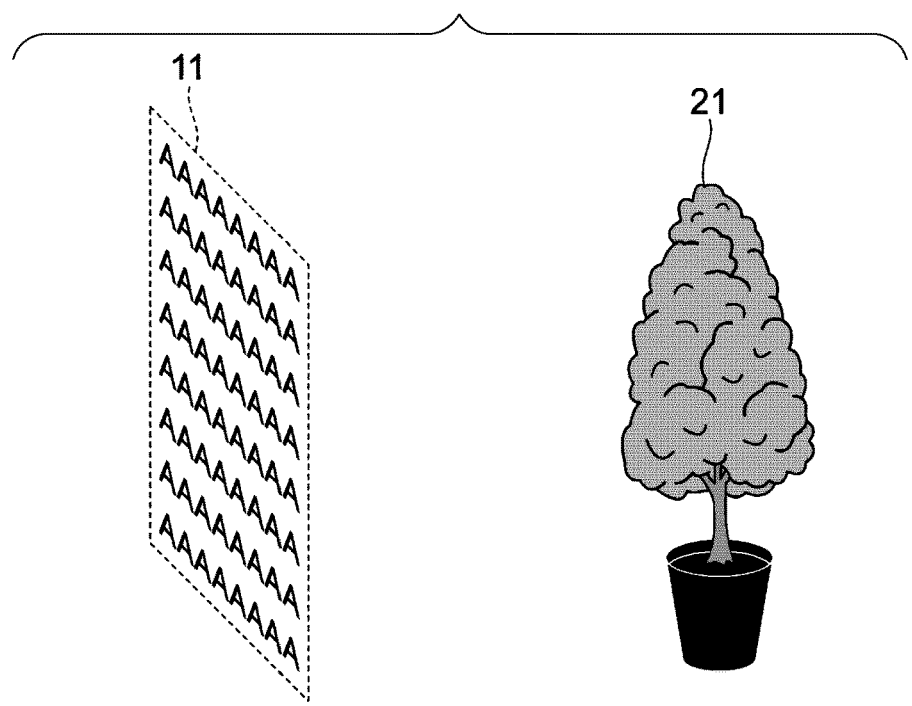
FIG. 10A is a diagram describing the case in which no persons are present near an aerial image and illustrating the positional relationship between the aerial image and a potted plant that is assumed to serve as a background.
Figure 10B:
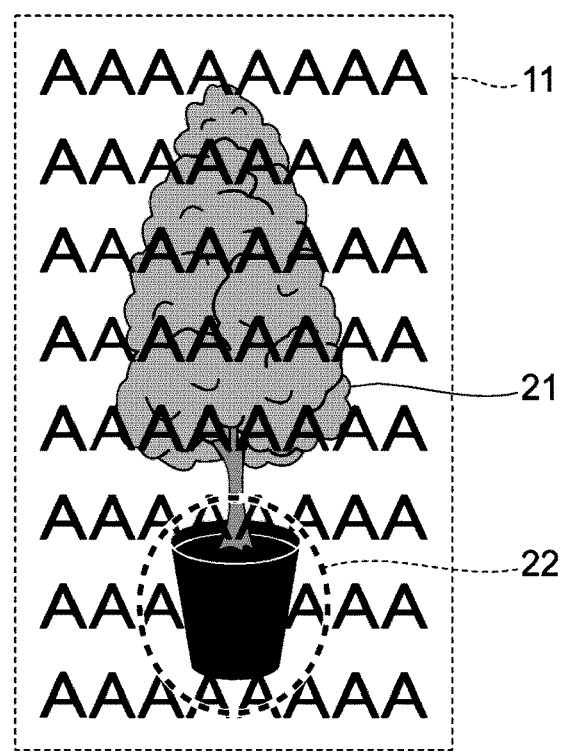
FIG. 10B is a diagram illustrating a view of the aerial image from the left side of FIG. 10A (opposite the potted plant)

FIGS. 10A and 10B are diagrams describing the case in which there are no persons near the aerial image 11. FIG. 10A illustrates the positional relationship between the aerial image 11 and the potted plant 21 that is assumed to serve as a background. FIG. 10B illustrates a view of the aerial image 11 from the left side of FIG. 10A (opposite to the potted plant 21).

This case indicates, for example, the state in which the negative determination result is obtained in step 1 in FIG. 9. In this case, as illustrated in FIG. 10B, the aerial image 11 is viewed as if being overlain on the potted plant 21 located behind. In FIGS. 10A and 10B, the aerial image 11 includes a black string. Characters in an area 22 overlain on the base of the potted plant 21 fail to be recognized. However, there are no persons who observe the aerial image 11, resulting in no specific troubles.

Second Formation Example

Figure 11A:
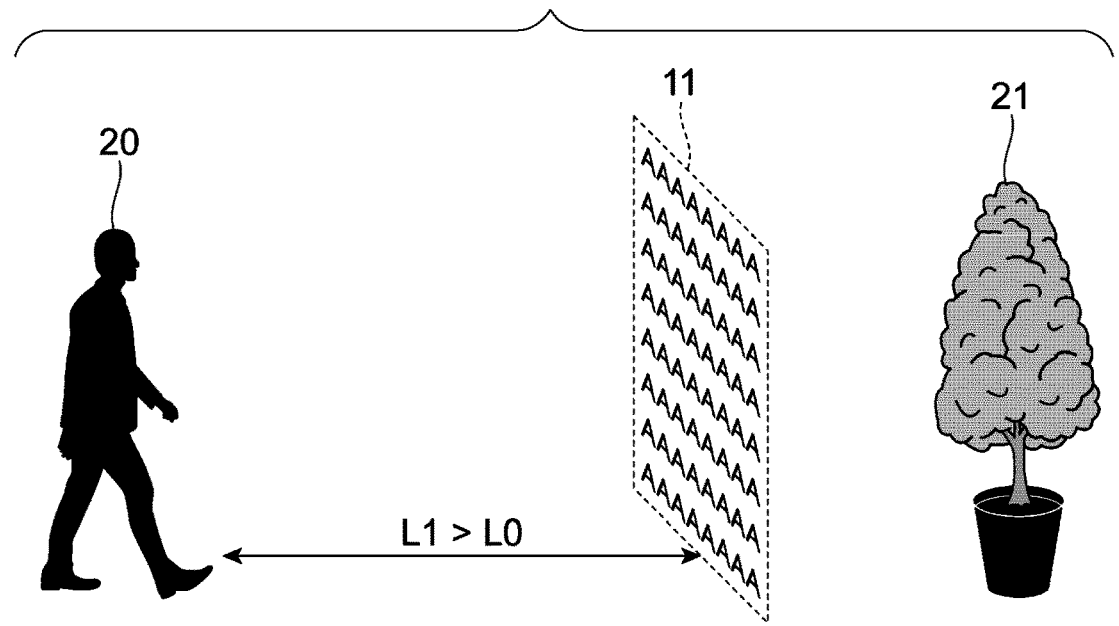
FIG. 11A is a diagram describing the case in which a person who is present near an aerial image is located at a distance greater than a threshold, and illustrating the positional relationship between the aerial image, the person, and a potted plant that is assumed to serve as a background.
Figure 11B:
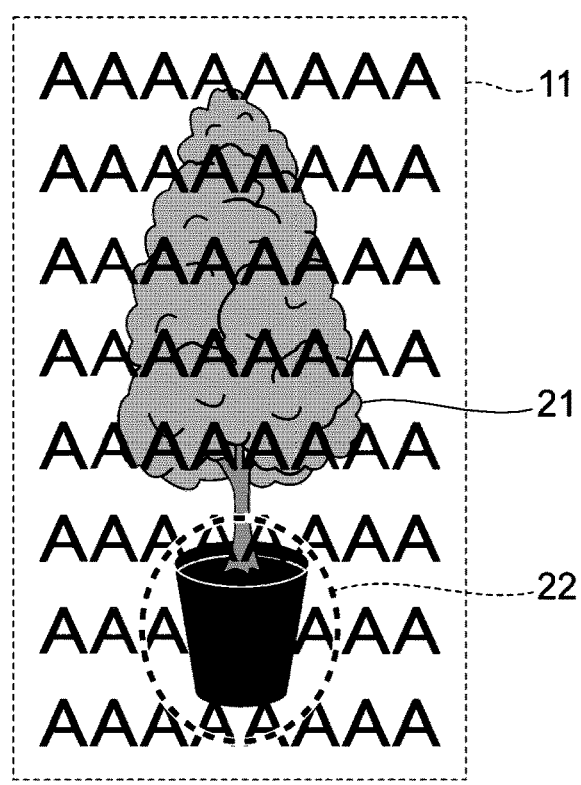
FIG. 11B is a diagram illustrating a view of the aerial image from the person obtained in the case of FIG. 11A.

FIGS. 11A and 11B are diagrams describing the case in which the person 20 who is present near the aerial image 11 is located at a distance greater than a threshold L0. FIG. 11A illustrates the positional relationship between the aerial image 11, the potted plant 21 that is assumed to serve as a background, and the person 20. FIG. 11B illustrates a view of the aerial image 11 from the person 20.

This case indicates, for example, a state in which the negative determination result is obtained in step 3 in FIG. 9. This state corresponds the case in which the person 20 is located at a distance where it is difficult to read characters in the aerial image 11. The threshold L0 is different, for example, depending on whether the display content in the aerial image 11 is characters or an image, and how large the characters or the image is, and whether a still image or a moving image is displayed.

Also in this example, if characters in the area 22 overlain on the base of the potted plant 21 fail to be recognized, this is not a big trouble.

Third Formation Example

Figure 12A:
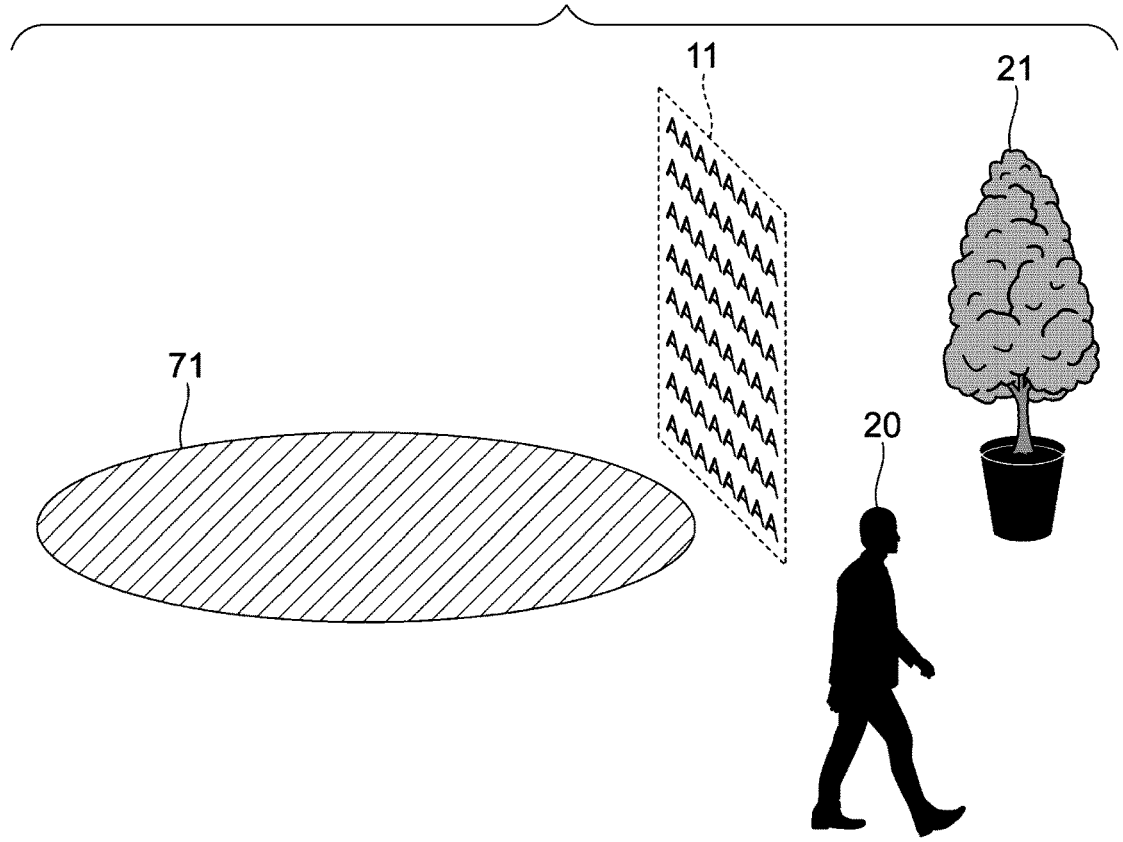
FIG. 12A is a diagram describing the case in which a person who is present near an aerial image is located outside a predetermined area, and illustrating the positional relationship between the aerial image, the person, and a potted plant that is assume to serve as a background.
Figure 12B:
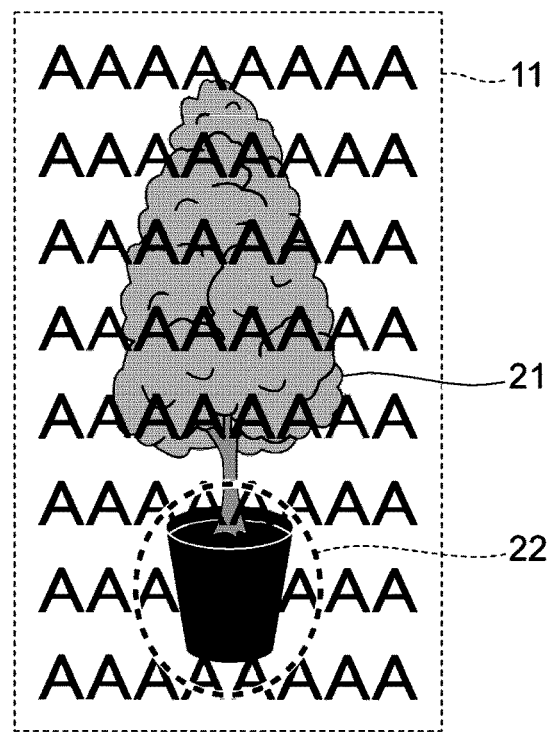
FIG. 12B is a diagram illustrating a view of the aerial image from the left side of FIG. 12A (opposite to the potted plant)

FIGS. 12A and 12B are diagrams describing the case in which the person 20 who is present near the aerial image 11 is not located in a predetermined area 71. FIG. 12A illustrates the positional relationship between the aerial image 11, the potted plant 21 that is assumed to serve as a background, and the person 20. FIG. 12B illustrates a view of the aerial image 11 from the left side of FIG. 12A (opposite to the potted plant 21). The area 71 may be defined by using the distance from the aerial image 11 and the direction to the aerial image 11. It is not necessary to define the area 71 strictly, and it is also not necessary to determine the area 71 accurately.

This case indicates, for example, the state in which the negative determination result is obtained in step 3 or 5 in FIG. 9. The example in FIGS. 12A and 12B corresponds to the case in which the person 20 is located at a position where the person 20 crosses the extension of the display plane of the aerial image 11.

Therefore, as illustrated in FIG. 12B, if characters in the area 22 overlain on the base of the potted plant 21 fail to be recognized, this is not a big trouble.

Fourth Formation Example

Figure 13A:
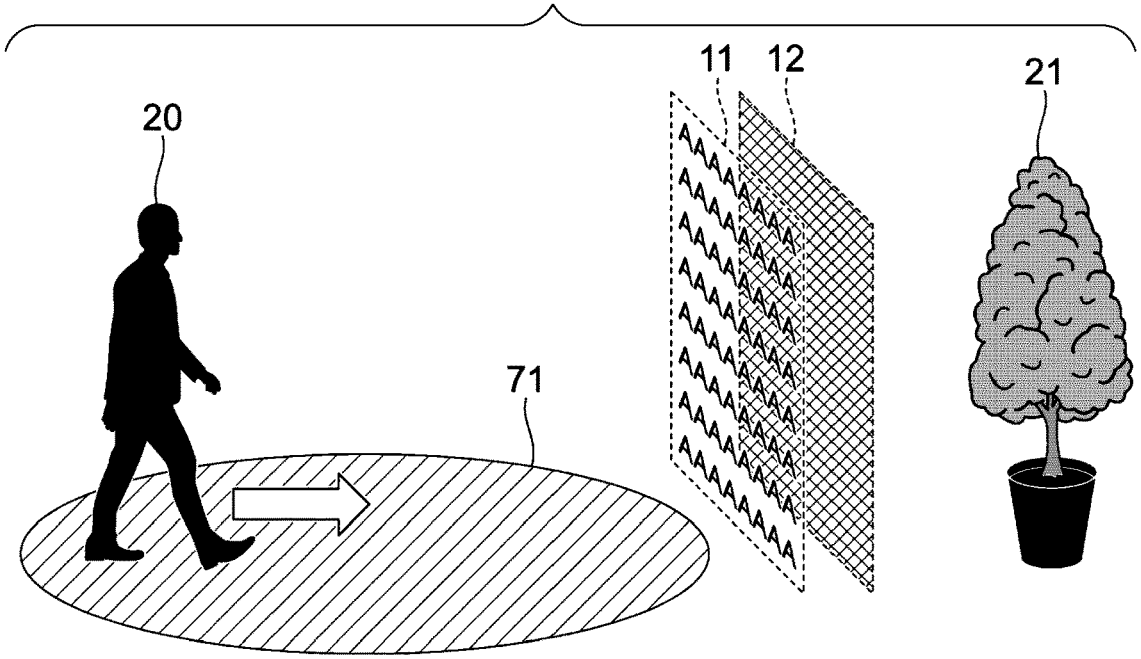
FIG. 13A is a diagram describing the case in which a person approaching a first aerial image is located inside a predetermined area, and illustrating the positional relationship between the first aerial image, a second aerial image, the person, and a potted plant that is assumed to serve as a background.
Figure 13B:
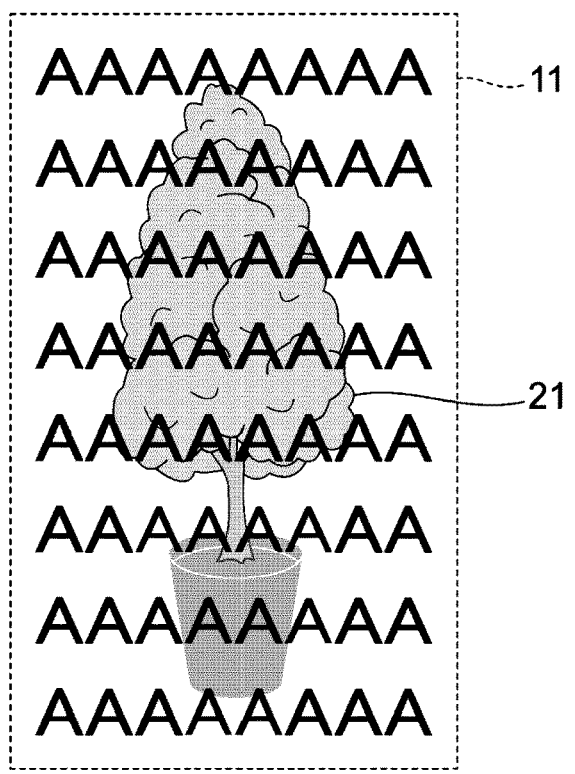
FIG. 13B is a diagram illustrating a view of the first aerial image from the person obtained in the case of FIG. 13A.

FIGS. 13A and 13B are diagrams describing the case in which the person 20 who is approaching the aerial image 11 is located in the predetermined area 71. FIG. 13A illustrates the positional relationship between the aerial image 11, the aerial image 12, the potted plant 21 that is assumed to serve as a background, and the person 20. FIG. 13B illustrates a view of the aerial image 11 from the person 20.

This case indicates, for example, the state in which the positive determination result is obtained in step 5 in FIG. 9.

In the example in FIGS. 13A and 13B, the aerial image 12 is formed between the aerial image 11 and the potted plant 21. In FIGS. 13A and 13B, a view of the potted plant 21 is suppressed. As a result, the characters on the aerial image 11 are easy to view.

Fifth Exemplary Embodiment

Figure 14A:
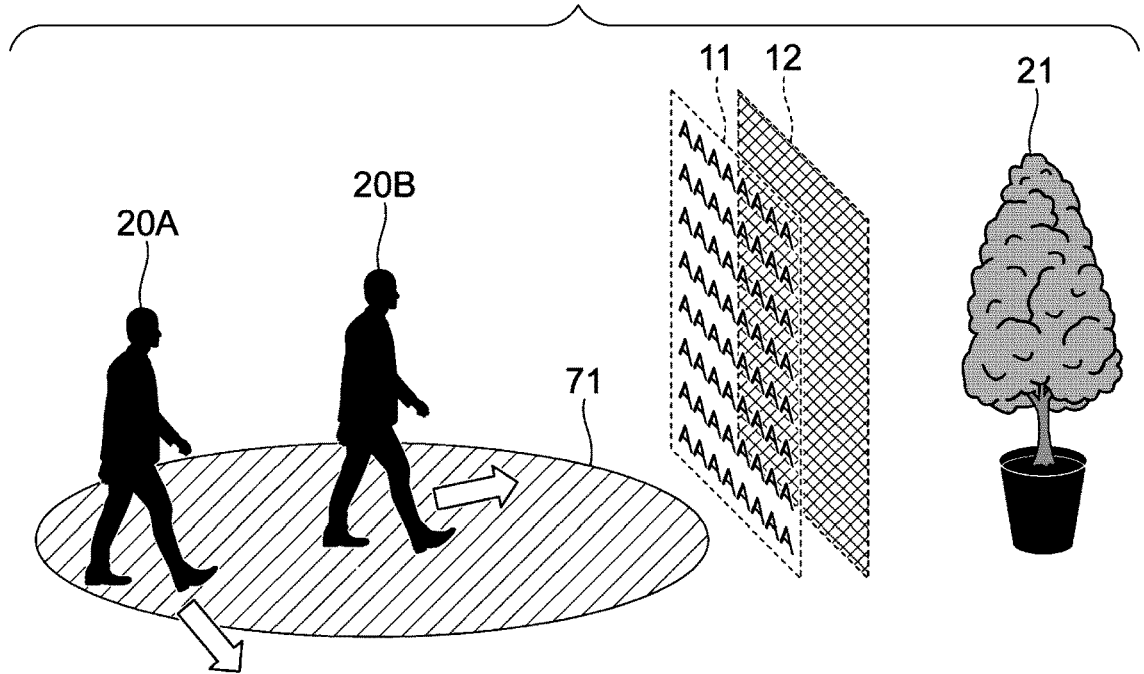
FIG. 14A is a diagram describing the case in which two persons are located inside a predetermined area, and illustrating the positional relationship between a first aerial image, a second aerial image, the persons, and a potted plant that is assumed to serve as a background.
Figure 14B:
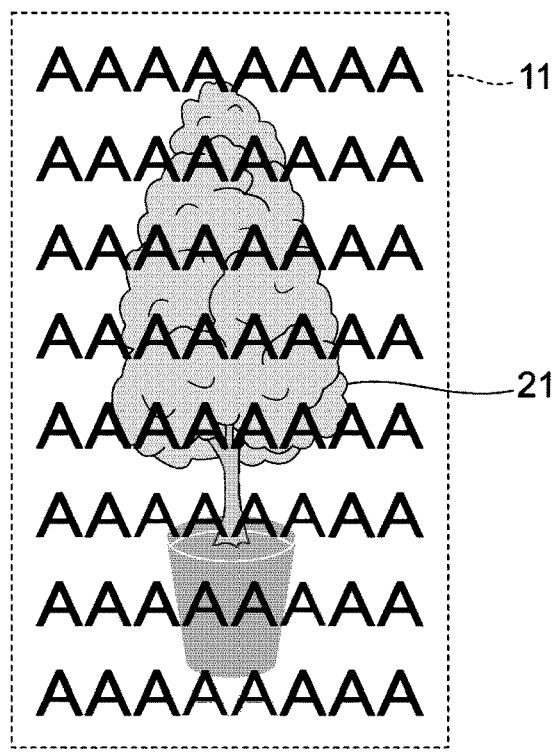
FIG. 14B is a diagram illustrating a view of the first aerial image from a person obtained in the case of FIG. 14A.

FIGS. 14A and 14B are diagrams describing the case in which two persons 20A and 20B are located in the predetermined area 71. FIG. 14A illustrates the positional relationship between the aerial image 11, the aerial image 12, the potted plant 21 that is assumed to serve as a background, and the persons 20A and 20B. FIG. 14B illustrates a view of the aerial image 11 from the person 20B.

In FIGS. 14A and 14B, while the person 20A who is located farther from the aerial image 11 does not approach the aerial image 11, the person 20B who is located nearer to the aerial image 11 is approaching the aerial image 11.

In this example, the image formation controller 62 (see FIG. 8) controls formation of the aerial image 12 by focusing on the person 20B who is located nearer to the aerial image 11.

The person 20B who is present in the area 71 satisfies the distance condition (the positive result in step 3), and also satisfies the condition for the approach direction (the positive result in step 5). Therefore, the aerial image 12 is formed behind the aerial image 11, improving the person 20B's visibility of the aerial image 11.

Figure 15A:
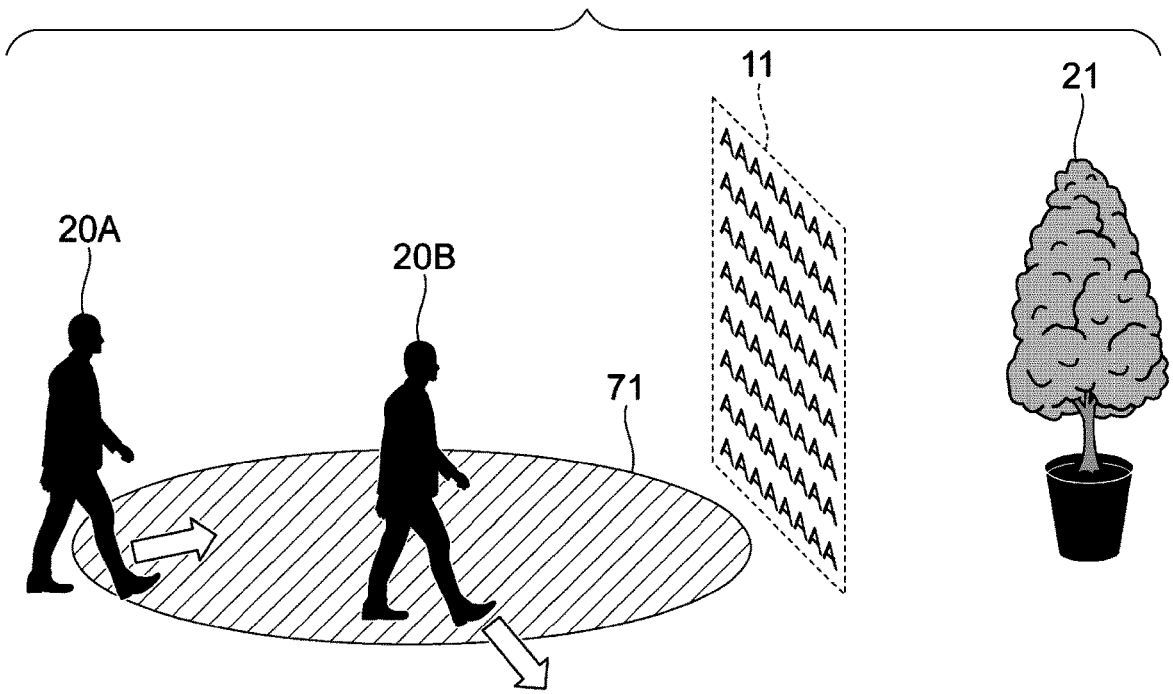
FIG. 15A is a diagram describing another exemplary case in which two persons are located inside a predetermined area, and illustrating the positional relationship between an aerial image, the persons, and a potted plant that is assumed to serve as a background.
Figure 15B:
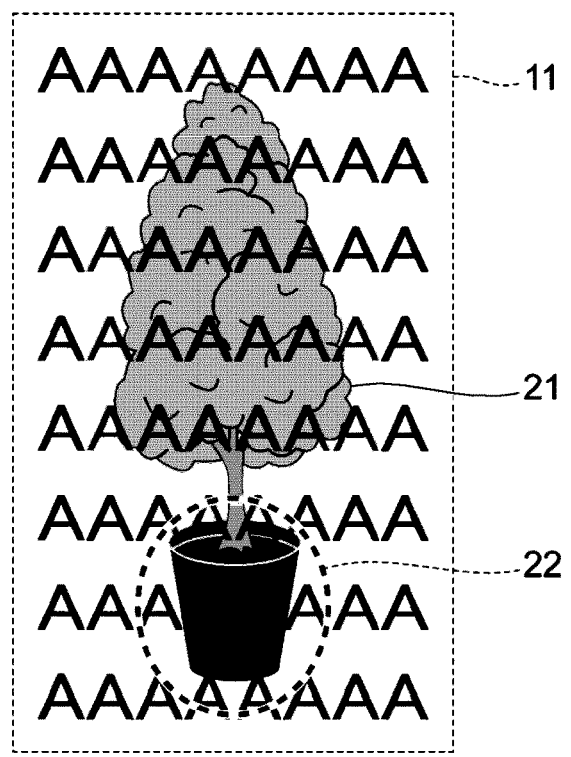
FIG. 15B is a diagram illustrating a view of the aerial image from the persons obtained in the case of FIG. 15A.

FIGS. 15A and 15B are diagrams describing another exemplary case in which the two persons 20A and 20B are located in the predetermined area 71. FIG. 15A illustrates the positional relationship between the aerial image 11, the potted plant 21 that is assumed to serve as a background, and the persons 20A and 20B. FIG. 15B illustrates a view of the aerial image 11 from the persons 20A and 20B.

In FIGS. 15A and 15B, while the person 20A who is located farther from the aerial image 11 is approaching the aerial image 11, the person 20B who is located nearer to the aerial image 11 does not approach the aerial image 11.

When the image formation controller 62 (see FIG. 8) controls formation of the aerial image 12 by focusing on the person 20B who is located nearer to the aerial image 11, the move of the person 20B does not satisfy the condition for formation of the aerial image 12. That is, the negative result is obtained in step 5.

Therefore, in FIGS. 15A and 15B, the aerial image 12 (see FIGS. 14A and 14B) is not formed.

A mechanism in which, if any person who is present in the area 71 satisfies the condition for formation of the aerial image 12, the aerial image 12 is formed may be employed.

Sixth Formation Example

Figure 16A:
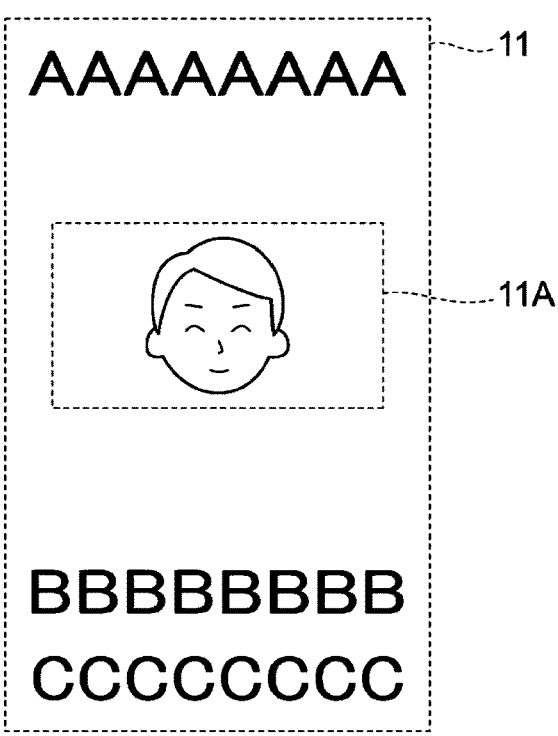
FIG. 16A is a diagram describing control of forming a first aerial image in accordance with a portion in which visibility of the first aerial image is affected, and illustrating an exemplary display of the first aerial image.
Figure 16B:
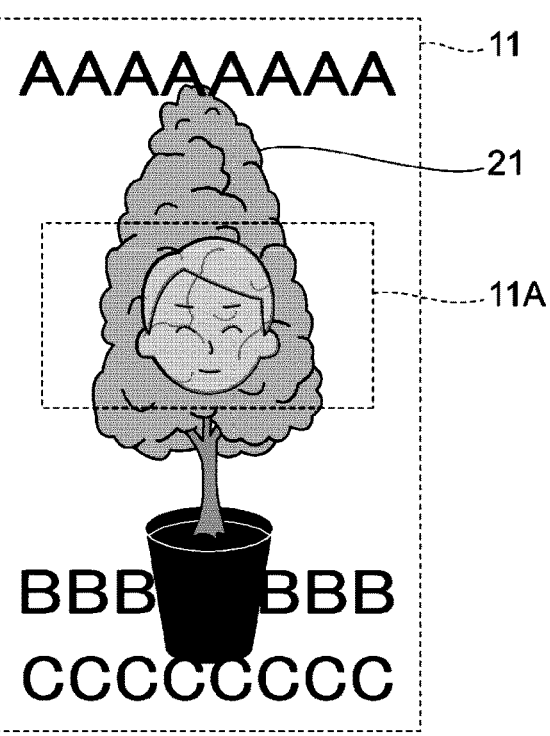
FIG. 16B is a diagram illustrating a view of the first aerial image obtained in the case where a second aerial image is not displayed.
Figure 16C:
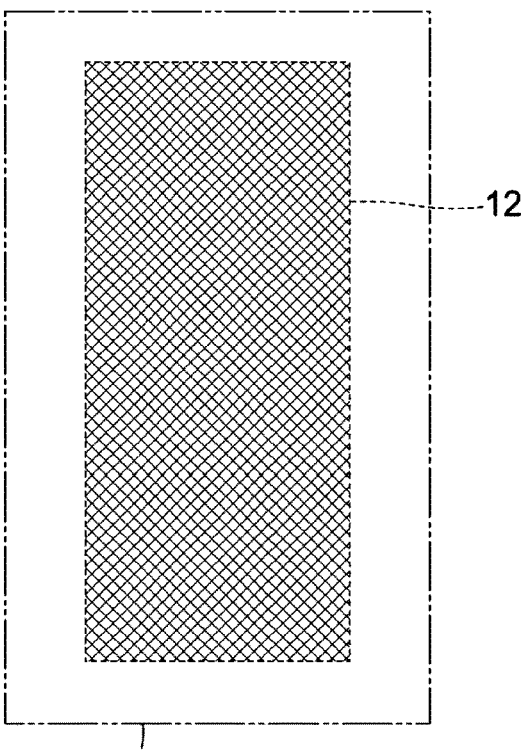
FIG. 16C is a diagram illustrating an exemplary display of the second aerial image.
Figure 16D:
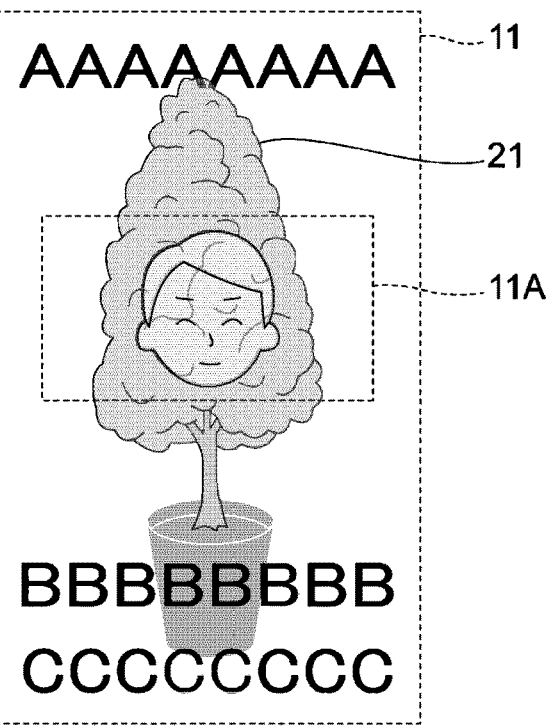
FIG. 16D is a diagram illustrating a view of the first aerial image obtained when the second aerial image is displayed.

FIGS. 16A to 16D are diagrams describing control of formation of the aerial image 12 in accordance with a portion having an effect on the visibility of the aerial image 11. FIG. 16A illustrates an exemplary display of the aerial image 11. FIG. 16B illustrates a view of the aerial image 11 obtained when the aerial image 12 is not displayed. FIG. 16C illustrates an exemplary display of the aerial image 12. FIG. 16D illustrates a view of the aerial image 11 obtained when the aerial image 12 is displayed.

In the aerial image 11 illustrated in FIG. 16A, strings "AAAAAAAA", "BBBBBBBB", and "CCCCCCCC", and a face image 11A are disposed in a center area.

When the aerial image 12 is not displayed, the color tone of the image 11A is affected by the color of leaves of the potted plant 21 that serves as a background. In addition, the string "BBBBBBBB" is difficult to recognize visually.

In FIGS. 16A to 16D, the aerial image 12 for reducing the visibility of the potted plant 21 is formed in accordance with the center area in which the characters and the image whose view is affected are disposed. Therefore, the area of the aerial image 12 is smaller than the area of the aerial image 11. Even the aerial image 12 having a smaller area improves the visibility of the characters and the image disposed on the aerial image 11.

Seventh Exemplary Embodiment

Examples in which the aerial image 12 is formed in accordance with the direction from which the person 20 approaches the aerial image 11 will be described by using FIGS. 17A to 18B.

Figure 17A:
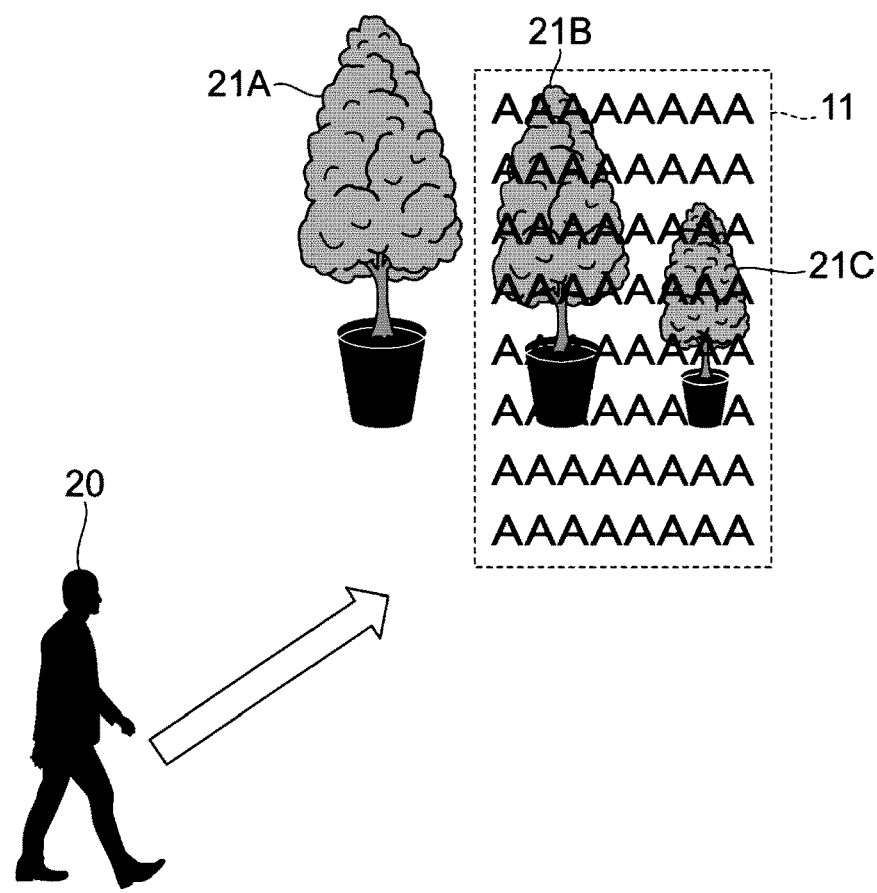
FIG. 17A is a diagram describing an example in which, in the case where potted plants are located behind a first aerial image, a second aerial image is formed when a person approaches the first aerial image in a first direction from which some of the potted plants are viewed through the first aerial image.
Figure 17B:
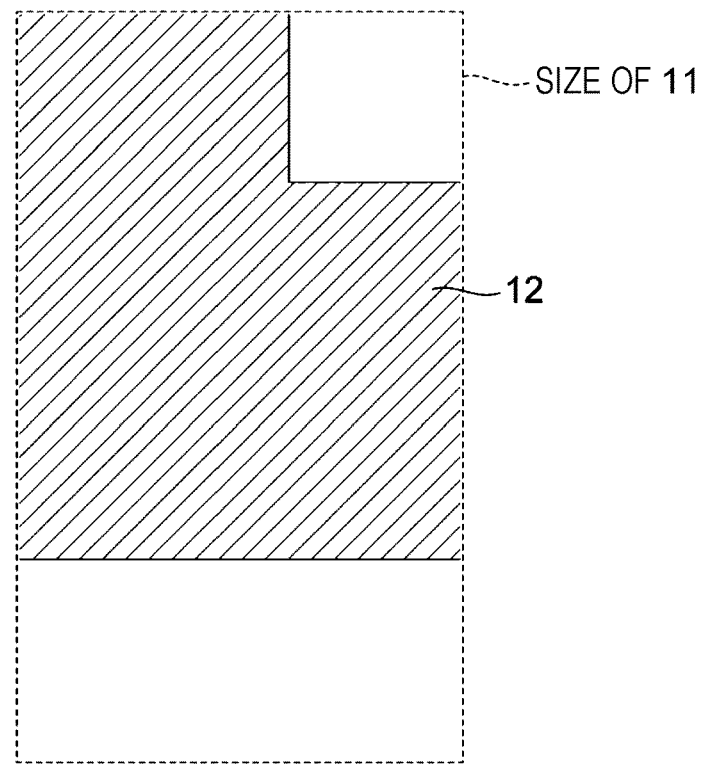
FIG. 17B is a diagram illustrating an exemplary display of the second aerial image.

FIGS. 17A and 17B are diagrams describing a formation example of the aerial image 12 obtained when the person 20 approaches the aerial image 11 in a first direction. FIG. 17A illustrates the state in which the person 20 approaches the aerial image 11 from a direction in which potted plants 21B and 21C among potted plants 21A, 21B, and 21C which are located behind the aerial image 11 are viewed through the aerial image 11. FIG. 17B illustrates an exemplary display of the aerial image 12.

Figure 18A:
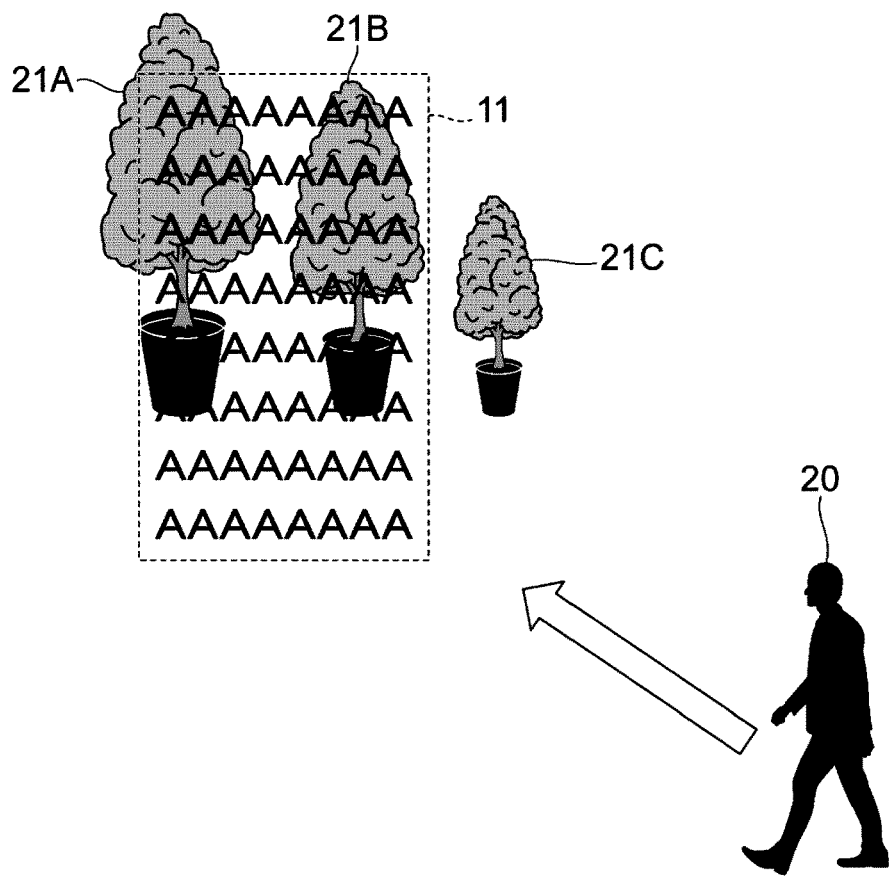
FIG. 18A is a diagram describing an example in which, in the case where potted plants are located behind a first aerial image, a second aerial image is formed when a person approaches the first aerial image in a second direction from which some of the potted plants are viewed through the first aerial image.
Figure 18B:
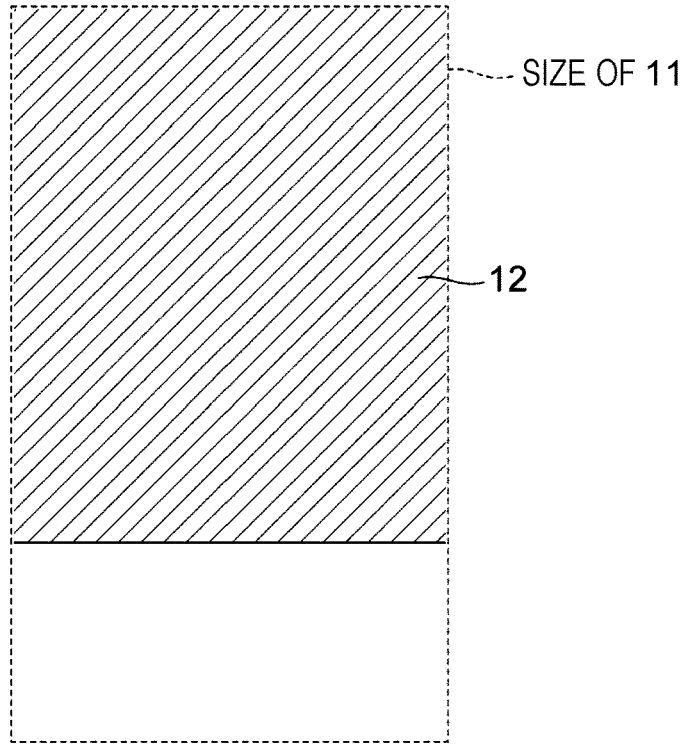
FIG. 18B is a diagram illustrating an exemplary display of the second aerial image.

FIGS. 18A and 18B are diagrams describing a formation example of the aerial image 12 obtained when the person 20 approaches the aerial image 11 in a second direction. FIG. 18A illustrates the state in which the person 20 approaches the aerial image 11 from a direction in which the potted plants 21A and 21B among the potted plants 21A, 21B, and 21C which are located behind the aerial image 11 are viewed through the aerial image 11. FIG. 18B illustrates an exemplary display of the aerial image 12.

To improve the visibility of the aerial image 11, the visibility of the potted plants 21A to 21C located in the background is to be reduced. Therefore, in the example in FIGS. 17A and 17B, the aerial image 12 having such a size that the medium-height potted plant 21B and the low-height potted plant 21C are hidden is formed. In contrast, in the example in FIGS. 18A and 18B, the aerial image 12 having such a size that the high-height potted plant 21A and the medium-height potted plant 21B are hidden is formed.

The difference in the shape of the aerial image 12 is determined depending on the background recognized visually in the direction from which the person 20 approaches the aerial image 11.

For example, the visibility control apparatus 33 (see FIG. 1) stores, in the storage device 54 (see FIG. 7), patterns of the aerial image 12 in accordance with the direction from which a person approaches the aerial image 11, and switches the pattern used in formation of the aerial image 12 in accordance with the determined direction from which the person approaches the aerial image 11.

Employment of this control enables the visibility of the aerial image 11 to be improved independently of the approach direction.

Eighth Formation Example

In the seventh formation example (FIGS. 17A to 18B), as illustrated in FIG. 1, the positional relationship in which, when the aerial image 12 is moved in the direction orthogonal to the display plane of the aerial image 11, the fringes of the two images match each other is assumed. The way of displaying the aerial image 12 for reducing the visibility of the background is not limited to this.

Figure 19A:
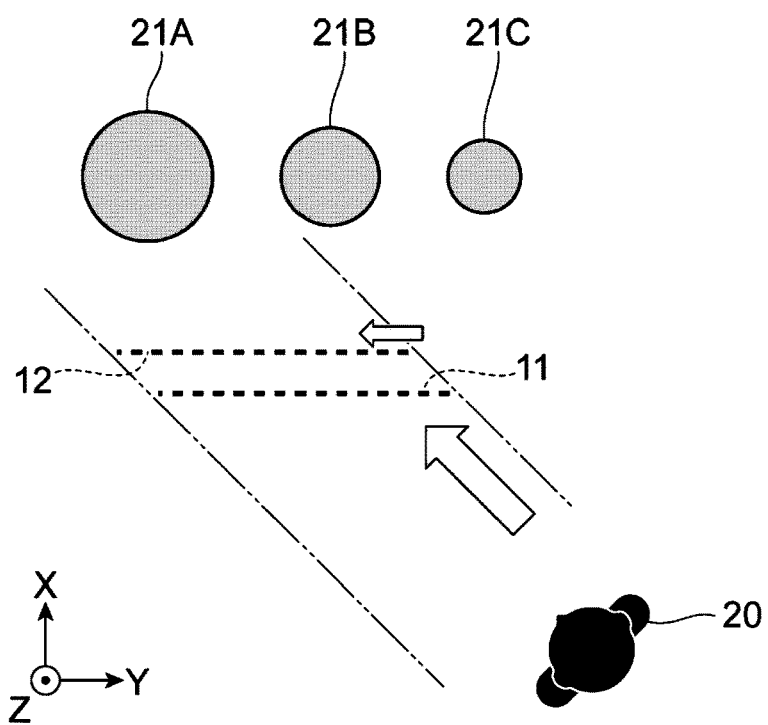
FIG. 19A is a diagram illustrating an example in which, in the case where a person approaches a first aerial image from the near right side of FIG. 19A, a second aerial image shifted relative to the first aerial image in the left direction of FIG. 19A is formed.
Figure 19B:
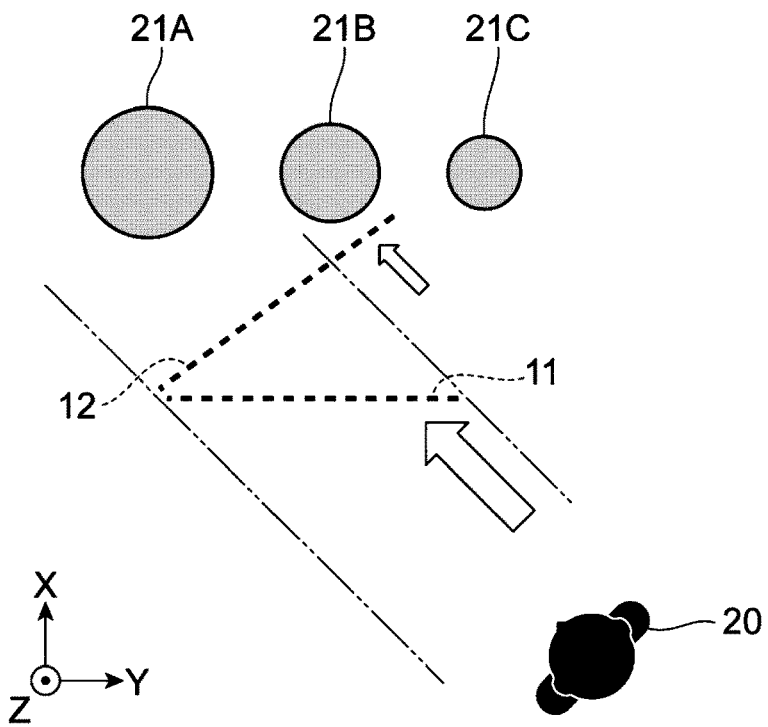
FIG. 19B is a diagram illustrating an example in which, in the case where a person approaches a first aerial image from the near right side of FIG. 19B, a second aerial image is formed at a counterclockwise angle so as to face the approaching person.

FIGS. 19A and 19B are diagrams illustrating formation examples of the aerial image 12 obtained when the person 20 approaches the aerial image 11 from the near right side of FIGS. 19A and 19B. FIG. 19A illustrates an example in which the aerial image 12 is formed so as to be shifted in the left direction of FIG. 19A with respect to the aerial image 11. FIG. 19B illustrates an example in which the aerial image 12 is formed at a counterclockwise angle so as to face the approaching person 20.

Figure 20A:
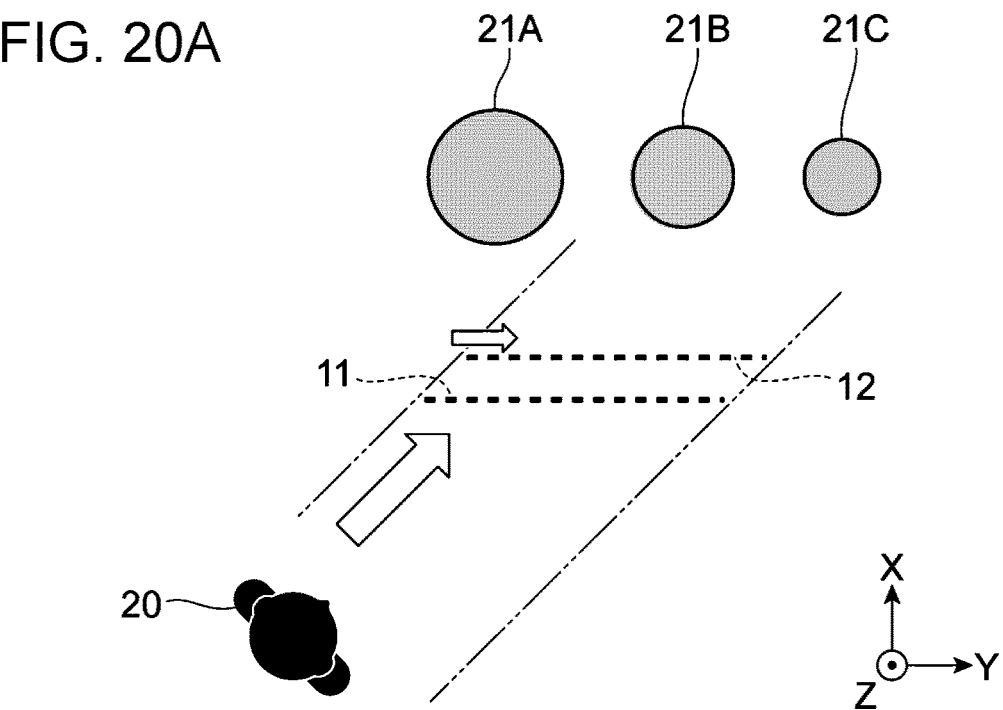
FIG. 20A is a diagram illustrating an example in which, in the case where a person approaches a first aerial image from the near left side of FIG. 20A, a second aerial image shifted relative to the first aerial image in the right direction of FIG. 20A is formed.
Figure 20B:
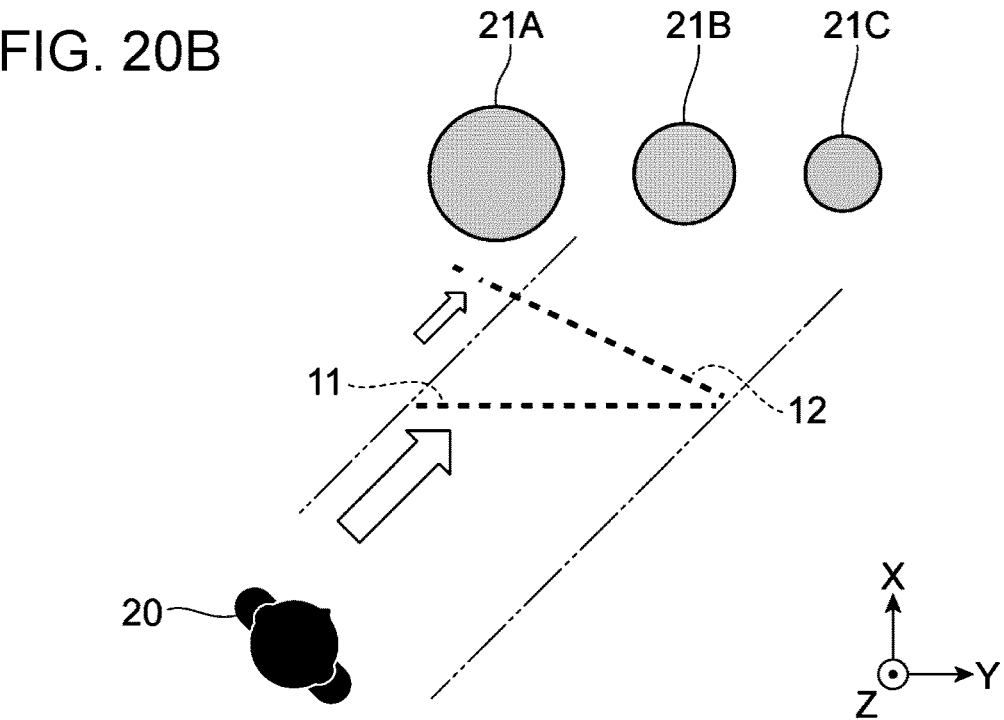
FIG. 20B is a diagram illustrating an example in which, in the case where a person approaches a first aerial image from the near left side of FIG. 20B, a second aerial image is formed at a clockwise angle so as to face the approaching person.

FIGS. 20A and 20B are diagrams illustrating formation examples of the aerial image 12 obtained when the person 20 approaches the aerial image 11 from the near left side of FIGS. 20A and 20B. FIG. 20A illustrates an example in which the aerial image 12 is formed so as to be shifted in the right direction of FIG. 20A with respect to the aerial image 11. FIG. 20B illustrates an example in which the aerial image 12 is formed at a clockwise angle so as to face the approaching person 20.

The shift amount and the angle are determined depending on the direction from which the person 20 approaching the aerial image 11.

To reduce the visibility of the potted plants 21A, 21B, and 21C located behind, the aerial image 12 may be formed in any way as long as the potted plants 21A, 21B, and 21C are not directly viewed through the aerial image 11 when viewed in the direction from which the person 20 approaches the aerial image 11.

The position at which the aerial image 12 is formed may be determined by moving the body of the aerial image forming apparatus 32, by moving, inside the aerial image forming apparatus 32, optical components included in the aerial image forming apparatus 32, or by changing the coordinates at which the aerial image 12 is formed.

Ninth Exemplary Embodiment

A method of determining, through image processing, an area in which the aerial image 12 is to be disposed will be described.

Figure 21A:
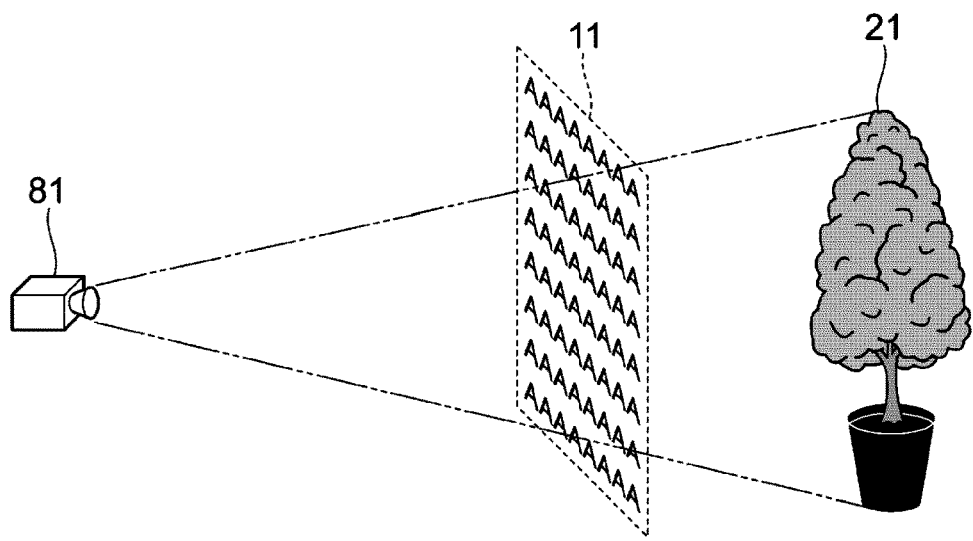
FIG. 21A is a diagram describing the state in which a view of an aerial image is imaged by using an imaging camera, and in which an area affected by a potted plant that serves as a background is specified through image processing, and illustrating the positional relationship between the imaging camera, the aerial image, and the potted plant.
Figure 21B:
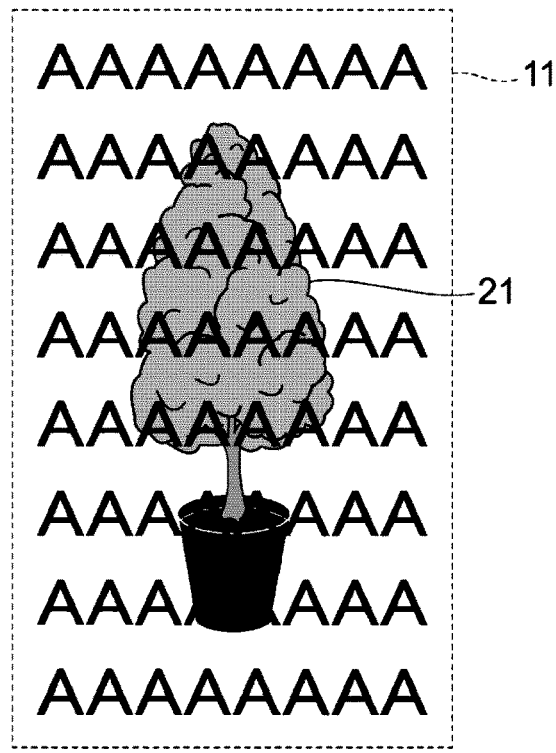
FIG. 21B is a diagram illustrating an exemplary image captured by the imaging camera.
Figure 21C:
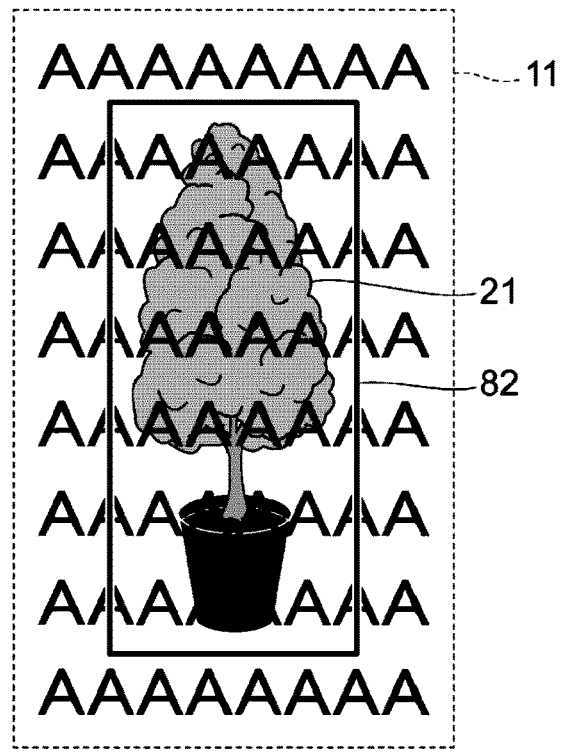
FIG. 21C is a diagram illustrating an area whose visibility is to be improved by using an aerial image.

FIGS. 21A to 21C are diagrams describing the state in which an imaging camera 81 is used to capture a view of the aerial image 11, and in which an area affected by the potted plant 21 serving as a background is specified through image processing. FIG. 21A illustrates the positional relationship between the imaging camera 81, the aerial image 11, and the potted plant 21. FIG. 21B illustrates an exemplary image captured by the imaging camera 81. FIG. 21C illustrates an area 82 whose visibility is to be improved by using the aerial image 12.

The imaging camera 81 is disposed at the height which is assumed as the height of the line of sight of the person 20.

Figure 22:
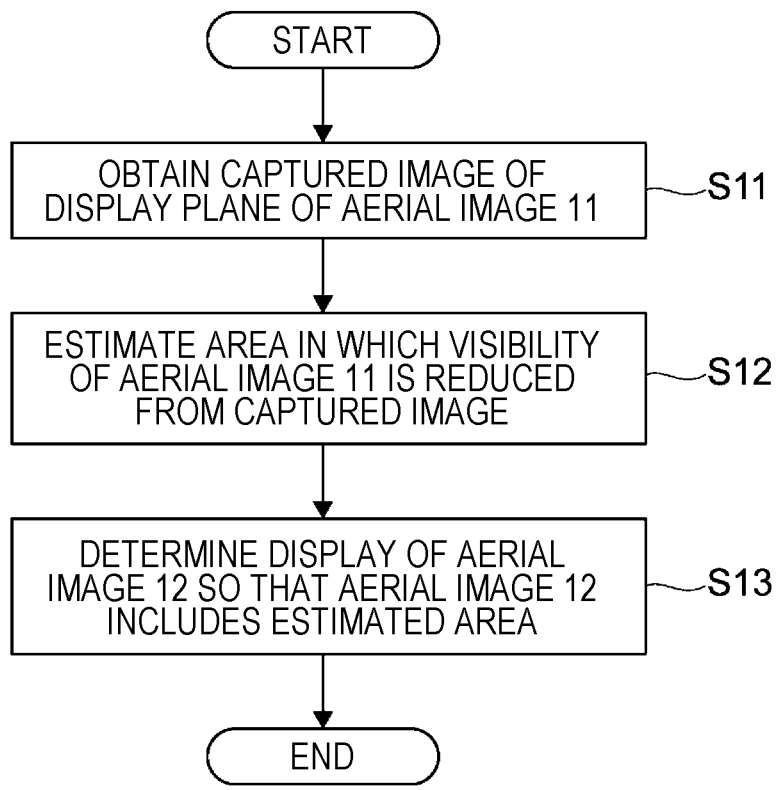
FIG. 22 is a flowchart describing an operation of determining the display of an aerial image by processing an image captured by an imaging camera.

FIG. 22 is a flowchart describing an operation for determining the display of the aerial image 12 by processing an image captured by the imaging camera 81.

In the first exemplary embodiment, the display of the aerial image 12 (see FIG. 1) is determined from an image captured through the visibility control apparatus 33 (see FIG. 1) executing programs. Alternatively, the display of the aerial image 12 may be determined by using an information processing apparatus (for example, a general-purpose computer) different from the visibility control apparatus 33, and the determined result may be set to the visibility control apparatus 33.

The visibility control apparatus 33 obtains a captured image of the display plane of the aerial image 11 (step 11). For example, the image illustrated in FIG. 21B is obtained. In FIG. 21B, the potted plant 21 is imaged in such a manner as to be overlain on characters on the aerial image 11.

The visibility control apparatus 33 estimates an area, in which the visibility of the aerial image 11 is reduced, from the captured image (step 12). In this estimation, for example, information displayed on the aerial image 11 is used to estimate an area in which a change with respect to the original color tone is present or an area in which an image (for example, an image of the potted plant 21) which is not present in the aerial image 11 is present.

After that, the visibility control apparatus 33 determines the display of the aerial image 12 so that the aerial image 12 includes the estimated area (step 13).

The determination may encompass, in addition to the position at which the aerial image 12 is to be displayed, content displayed as the aerial image 12. For example, display of a color tone forming a complementary color relationship with the aerial image 11 may be selected so that the visibility of the aerial image 11 is aggressively improved.

Tenth Formation Example

In the formation examples described above, as a precondition, a background object affecting the visibility of the aerial image 11 is basically not moved. In this formation example, a method of determining the display of the aerial image 12 under the assumption that a background object affecting the visibility of the aerial image 11 is moved will be described.

Figure 23A:
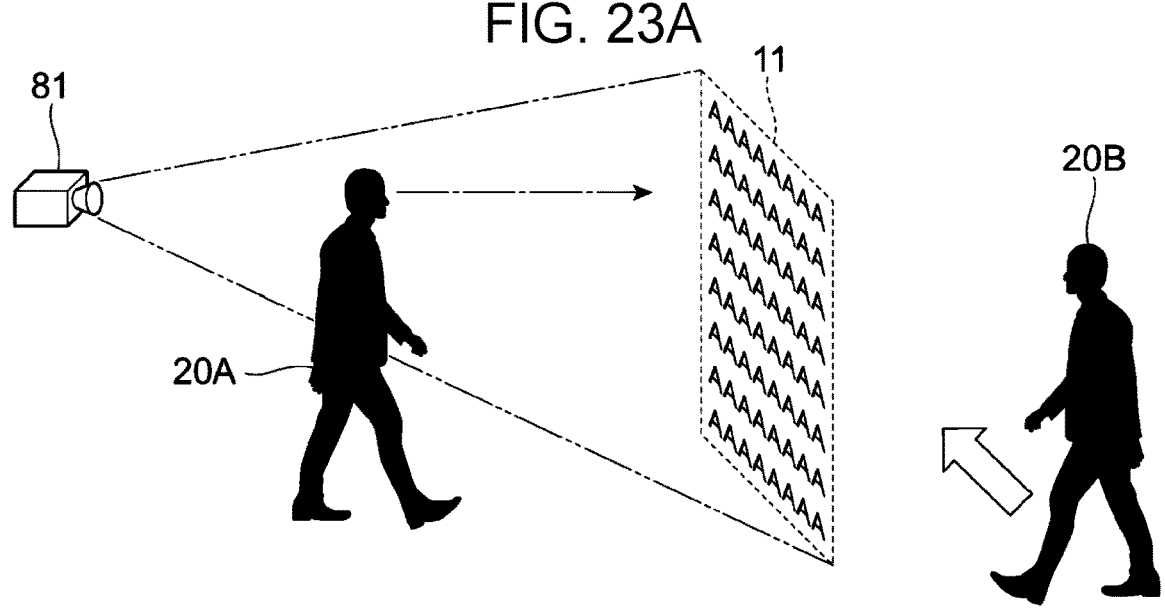
FIG. 23A is a diagram describing an example in which the area of a person moving behind a first aerial image is determined through image processing and in which the determination result is fed into the display of a second aerial image, and illustrating the positional relationship between an imaging camera, the first aerial image, an observer, and the person moving behind.
Figure 23B:
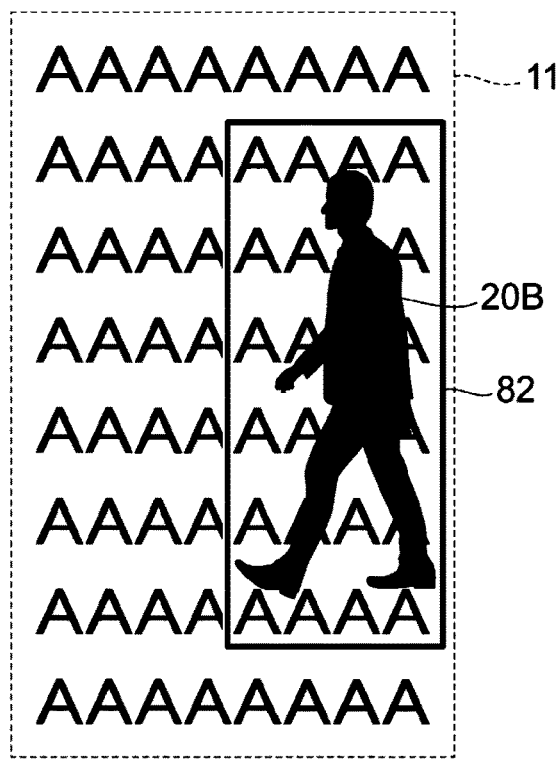
FIGS. 23B and 23C are diagrams illustrating examples of determination of an area whose visibility is to be improved by using the second aerial image.
Figure 23C:
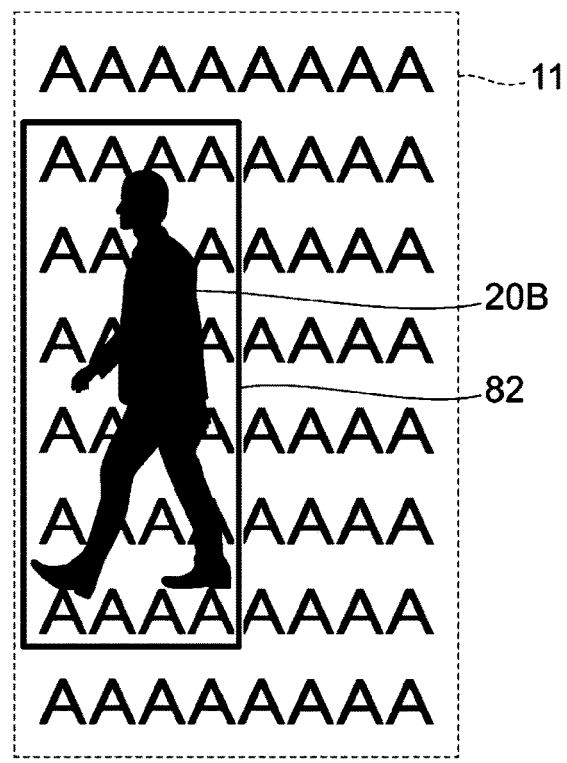

FIGS. 23A to 23C are diagrams describing an example in which the area of the person 20B moving behind the aerial image 11 is determined through image processing and in which the result is fed into the display of the aerial image 12. FIG. 23A illustrates the positional relationship between the imaging camera 81, the aerial image 11, the person 20A who is an observer, and the person 20B who is moving behind. FIGS. 23B and 23C illustrate examples of determination of the area 82 whose visibility is to be improved by using the aerial image 12.

In FIG. 23A, the imaging camera 81 is disposed on the side of the person 20A who is an observer, and images the aerial image 11 from the back side of the person 20A. It is desirable that the area of imaging using the imaging camera 81 include an area around and behind the aerial image 11. A large imaging area improves the accuracy in estimation of the position and the move direction of the person 20B who is moving behind the aerial image 11.

In FIG. 23A, the person 20B on the background side is moving in the direction from the right end to the left end of the aerial image 11 when viewed from the observer. Therefore, at time point T1, the person 20B is imaged in a right end portion of the aerial image 11. At time point T2, the person 20B is imaged in a left end portion of the aerial image 11.

Figure 24A:
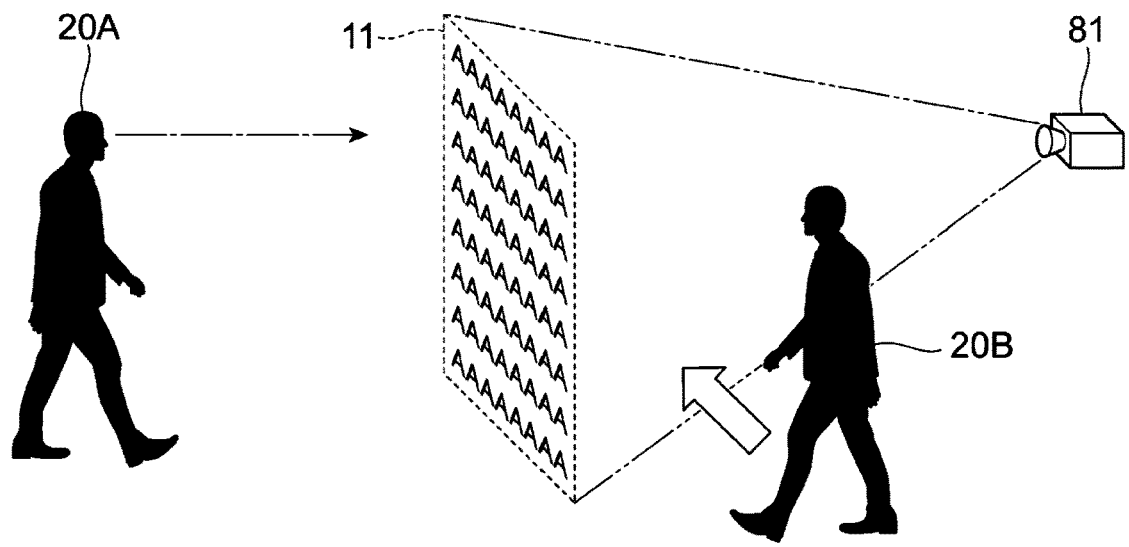
FIG. 24A is a diagram describing another example in which the area of a person moving behind a first aerial image is determined through image processing and in which the determination result is fed into the display of a second aerial image, and illustrating the positional relationship between an imaging camera, the first aerial image, an observer, and the person moving behind.
Figure 24B:
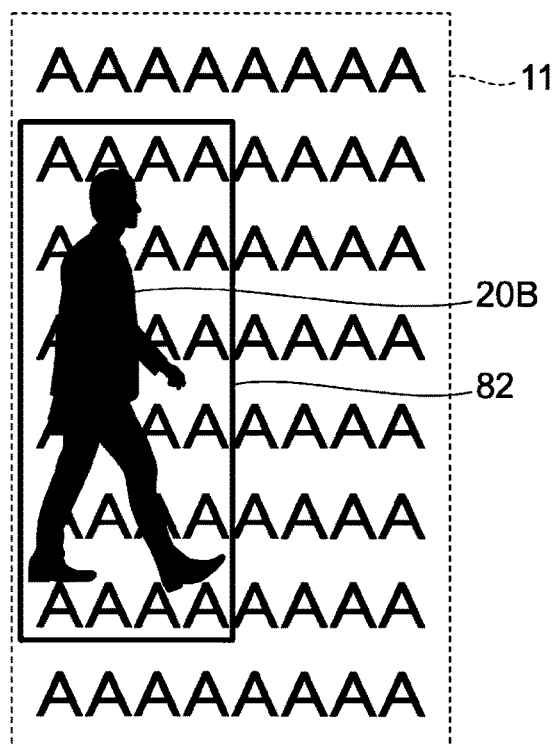
FIGS. 24B and 24C are diagrams illustrating examples of determination of an area whose visibility is to be improved by using the second aerial image.
Figure 24C:
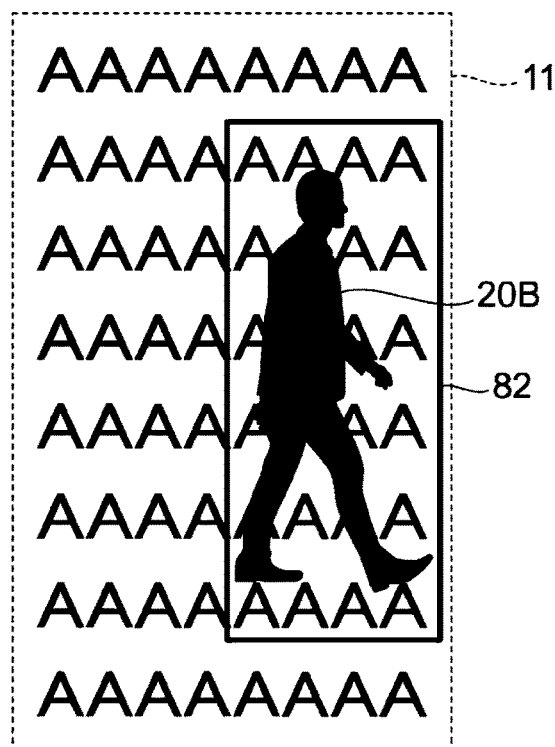

FIGS. 24A to 24C are diagrams describing another example in which an area of the person 20B who is moving behind the aerial image 11 is determined through image processing and in which the result is fed into the display of the aerial image 12. FIG. 24A illustrates the positional relationship between the imaging camera 81, the aerial image 11, the person 20A who is an observer, and the person 20B who is moving behind. FIGS. 24B and 24C illustrate examples of determination of the area 82 whose visibility is to be improved by using the aerial image 12.

In FIG. 24A, the imaging camera 81 is disposed on the background side of the aerial image 11, and images the aerial image 11 from the back side of the person 20B who is moving on the background side. This arrangement gives high priority to the imaging camera 81 specifying the position of the person 20B in the aerial image 11.

Also in FIGS. 24A to 24C, the person 20B on the background side is moving in the direction from the right end to the left end of the aerial image 11 when viewed from the observer. However, the imaging camera 81 images the aerial image 11 on the same side as the person 20B on the background side. Therefore, at time point T1, the person 20B is imaged in a left end portion of the aerial image 11. At time point T2, the person 20B is imaged in a right end portion of the aerial image 11.

Eleventh Formation Example

A method of setting an area whose visibility is to be improved by using the aerial image 12 will be described.

Figure 25:
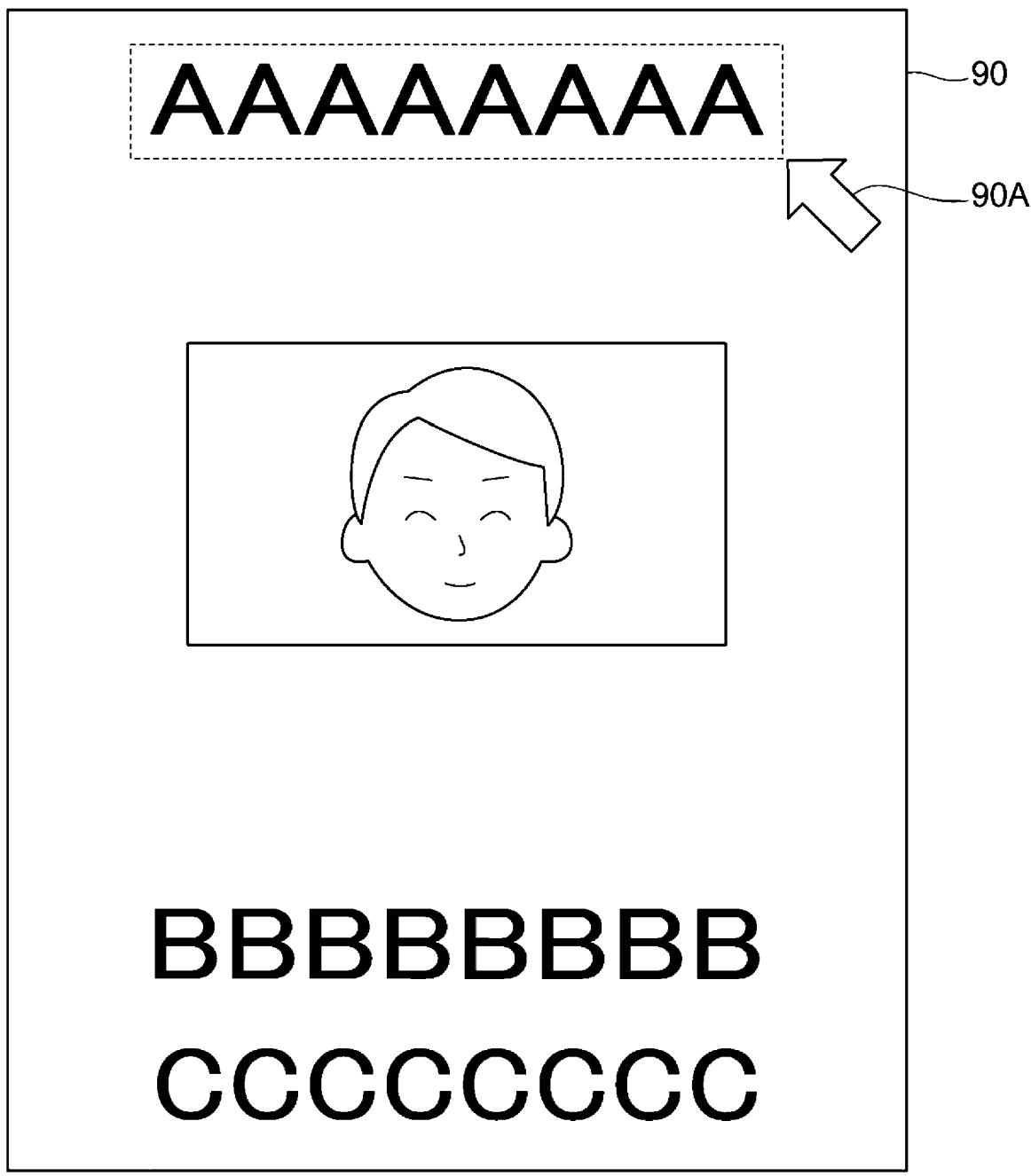
FIG. 25 is a diagram illustrating an exemplary original image displayed as an aerial image.

FIG. 25 is a diagram illustrating an exemplary original image 90 displayed as the aerial image 11.

The original image 90 includes strings, "AAAAAAAA", "BBBBBBBB", and "CCCCCCCC", and a face image.

The areas of the strings and the image may be extracted through image processing, or may be specified manually by an operator. The image processing is performed, for example, by using the visibility control apparatus 33 (see FIG. 1) or a computer (not illustrated). In the image processing, a corresponding area is extracted according to a predetermined condition. Even when a string or an image is present, if the recognized area, the font size, or the like is small, the string or the image may be excluded from extraction targets. When an operator element, such as an operation button or a numeric keypad, is present, even if the character is small, the operator element may be extracted as an area whose visibility is to be improved.

Alternatively, a mouse cursor 90A may be used to specify an area manually. In FIG. 25, a string, "AAAAAAAA", is specified, and the specified area is surrounded by a broken line.

As long as the shape in which the aerial image 12 is formed includes an extracted or specified area, any shape may be used. The shape does not need to match an extracted or specified area.

In addition, display of a color tone (for example, an opposite color) which improves the visibility may be assigned to the aerial image 12 in accordance with the color tone of the extracted or specified area.

Use of this method enables aggressive improvement of the visibility of a string or an image on the aerial image 11 regardless of whether or not a background reducing the visibility is present.

Twelfth Formation Example

A view of the potted plant 21 located on the background changes in accordance with the distance between the person 20 and the aerial image 11.

Figure 26A:
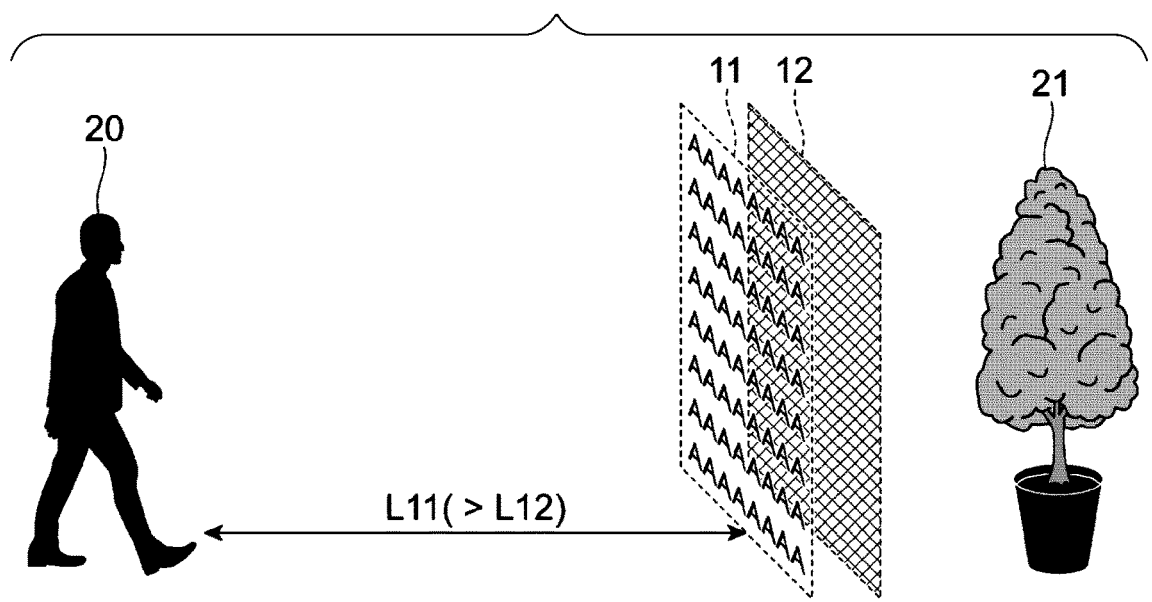
FIG. 26A is a diagram describing an example in which, when a person is located at a long distance from a first aerial image, a second aerial image is formed to improve the visibility, and illustrating the positional relationship between the first aerial image, the second aerial image, a potted plant, and the person who is an observer.
Figure 26B:
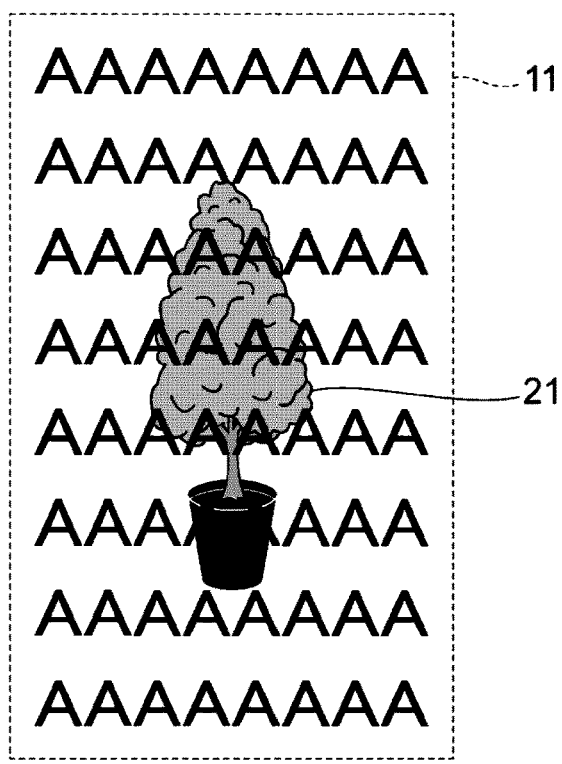
FIG. 26B is a diagram illustrating a view of the first aerial image when the person is located at a long distance from the first aerial image.
Figure 26C:
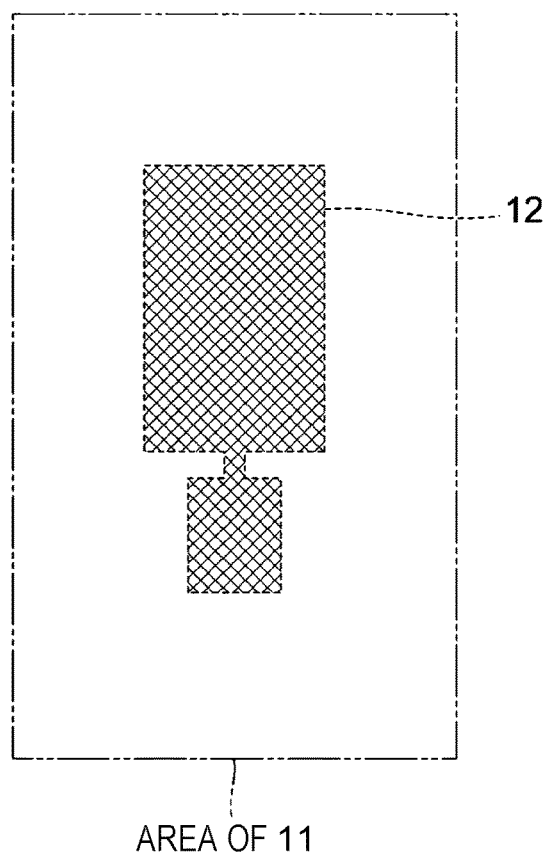
FIG. 26C is a diagram illustrating an exemplary display of the second aerial image.

FIGS. 26A to 26C are diagrams describing an example of a view of the aerial image 11 obtained in the case where the person 20 is located at a long distance from the aerial image 11 (in the case of L11), and an example of the aerial image 12 formed to improve the visibility. FIG. 26A illustrates the positional relationship between the aerial image 11, the aerial image 12, the potted plant 21, and the person 20 who is an observer. FIG. 26B illustrates a view of the aerial image 11. FIG. 26C illustrates an exemplary display of the aerial image 12.

Figure 27A:
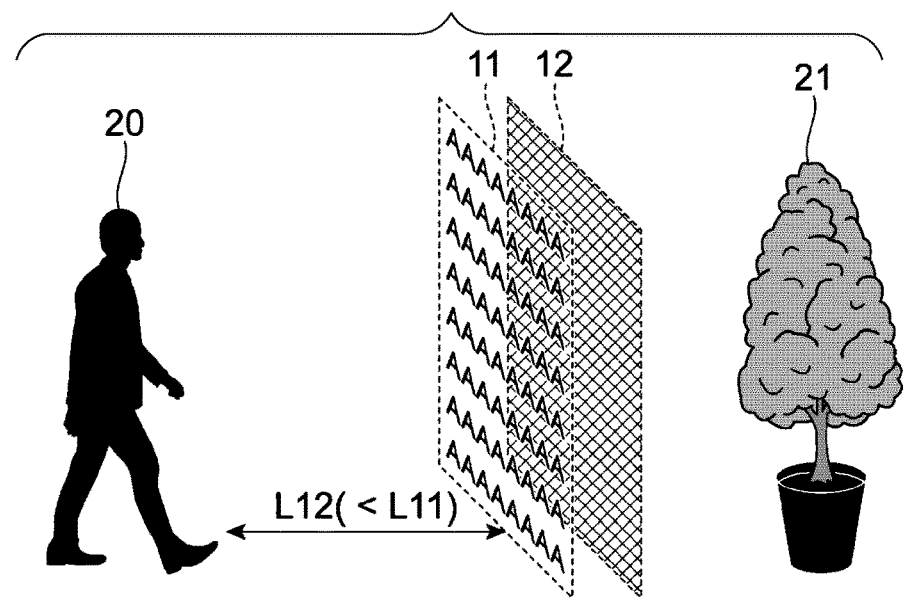
FIG. 27A is a diagram describing an example in which, when a person is located at a short distance from a first aerial image, a second aerial image is formed to improve the visibility, and illustrating the positional relationship between the first aerial image, the second aerial image, a potted plant, and the person who is an observer.
Figure 27B:
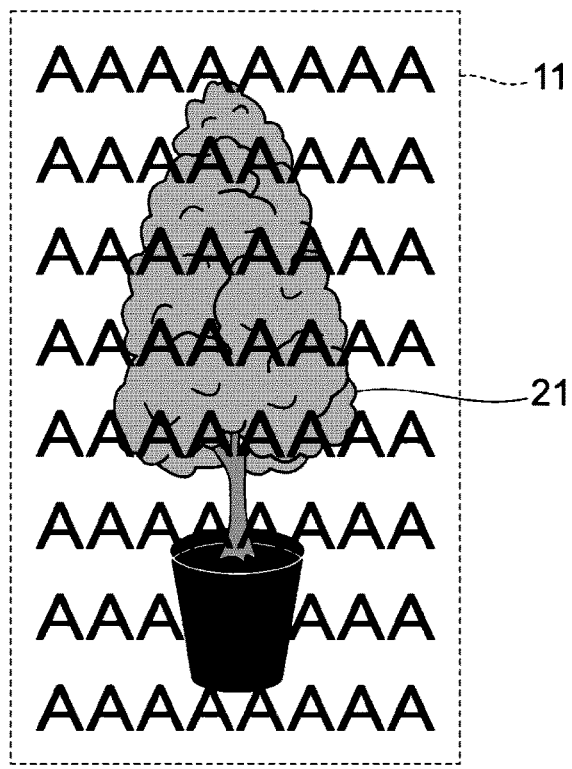
FIG. 27B is a diagram illustrating a view of the first aerial image when the person is located at a short distance from the first aerial image.
Figure 27C:
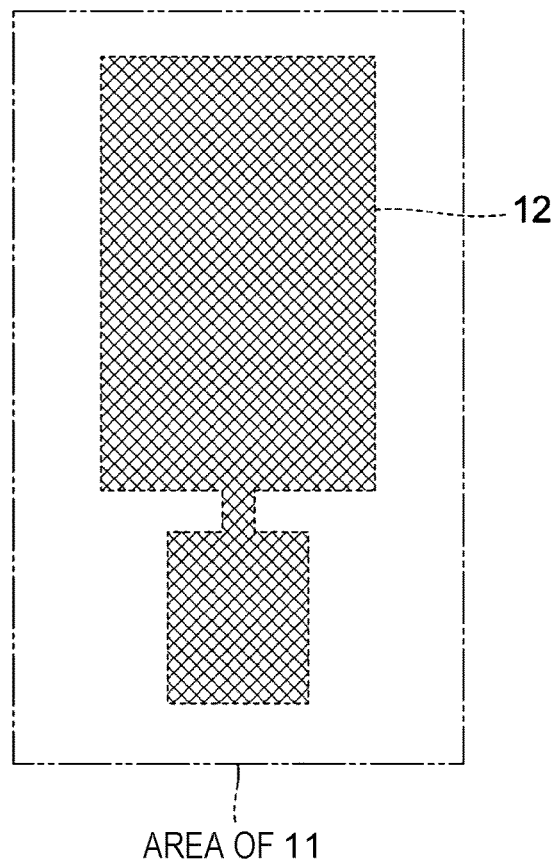
FIG. 27C is a diagram illustrating an exemplary display of the second aerial image.

FIGS. 27A to 27C are diagrams describing an example of a view of the aerial image 11 obtained in the case where the person 20 is located at a short distance from the aerial image 11 (in the case of L12), and an example of the aerial image 12 formed to improve the visibility. FIG. 27A illustrates the positional relationship between the aerial image 11, the aerial image 12, the potted plant 21, and the person 20 who is an observer. FIG. 27B illustrates a view of the aerial image 11. FIG. 27C illustrates an exemplary display of the aerial image 12.

The distance between the person 20 and the aerial image 11 is shorter than the distance between the person 20 and the potted plant 21. Therefore, the potted plant 21 viewed through the aerial image 11 is likely to be viewed as being relatively small due to the near-far effect.

This relationship is common even when the distance between the person 20 and the potted plant 21 is short or long. However, when the distance is short, a view of the potted plant 21 in the aerial image 11 comes closer to the actual-size relationship.

FIGS. 26A to 27C indicate the relationship in an emphasized manner.

Therefore, when the shape of the display area of the aerial image 12 is determined in accordance with the shape of an object (for example, the potted plant 21) viewed as a background, the content of the aerial image 12 is desirably determined or changed in accordance with the distance between the person 20 who is an observer and the aerial image 11.

Thirteenth Formation Example

In the formation examples described above, the case in which the shape of the aerial image 11 is common to the shape of the aerial image 12, or in which the aerial image 12 smaller than the aerial image 11 is formed is described. The shape of the aerial image 12 improving the visibility may be larger than the shape of the aerial image 11.

Figure 28A:
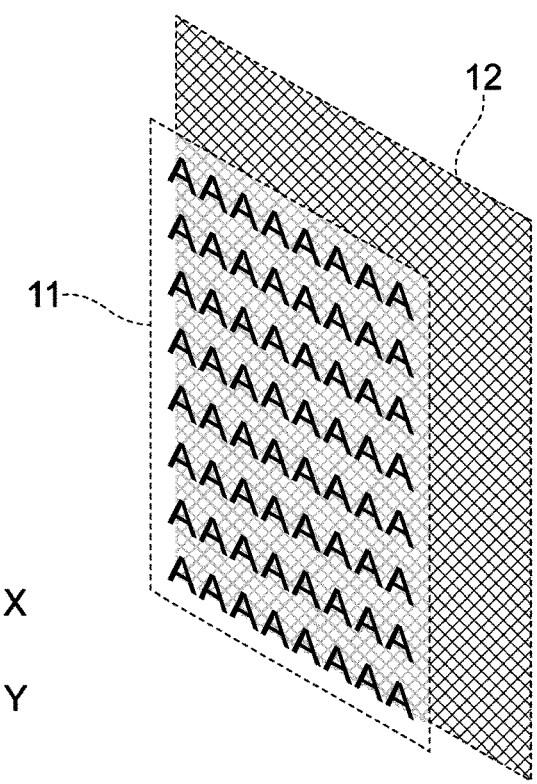
FIG. 28A is a diagram describing an example in which a second aerial image formed behind is made larger than a first aerial image, and is a view obtained when the first and second aerial images are observed in an oblique direction.
Figure 28B:
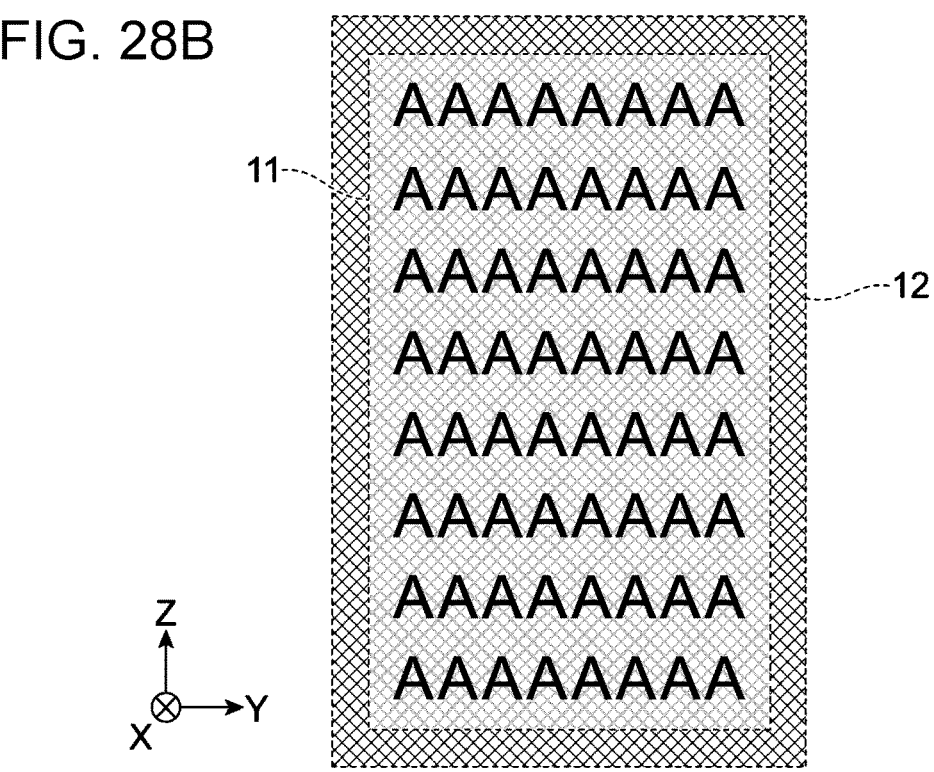
FIG. 28B is a view obtained when the first aerial image is observed from the front.

FIGS. 28A and 28B are diagrams describing an example in which the shape of the aerial image 12 formed behind the aerial image 11 is large. FIG. 28A is a diagram illustrating the aerial images 11 and 12 viewed in an oblique direction. FIG. 28B is a diagram illustrating the aerial image 11 viewed from the front.

As illustrated in FIGS. 28A and 28B, the shape of the aerial image 12 formed behind is larger than that of the aerial image 11 located on the near side. Thus, the aerial image 12 may be visually recognized as a frame. The resulting effect is that the fringe of the aerial image 11 is emphasized, improving the visibility.

Fourteenth Formation Example

Figure 29A:
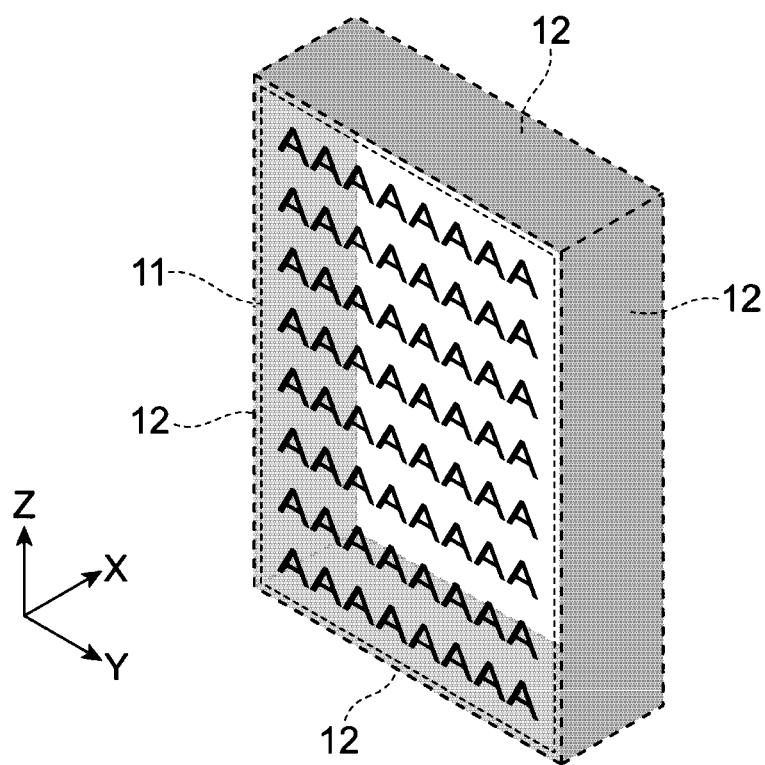
FIG. 29A is a diagram describing another exemplary formation of a second aerial image which improves the visibility of a first aerial image, and is a view obtained when the first and second aerial images are observed in an oblique direction.
Figure 29B:
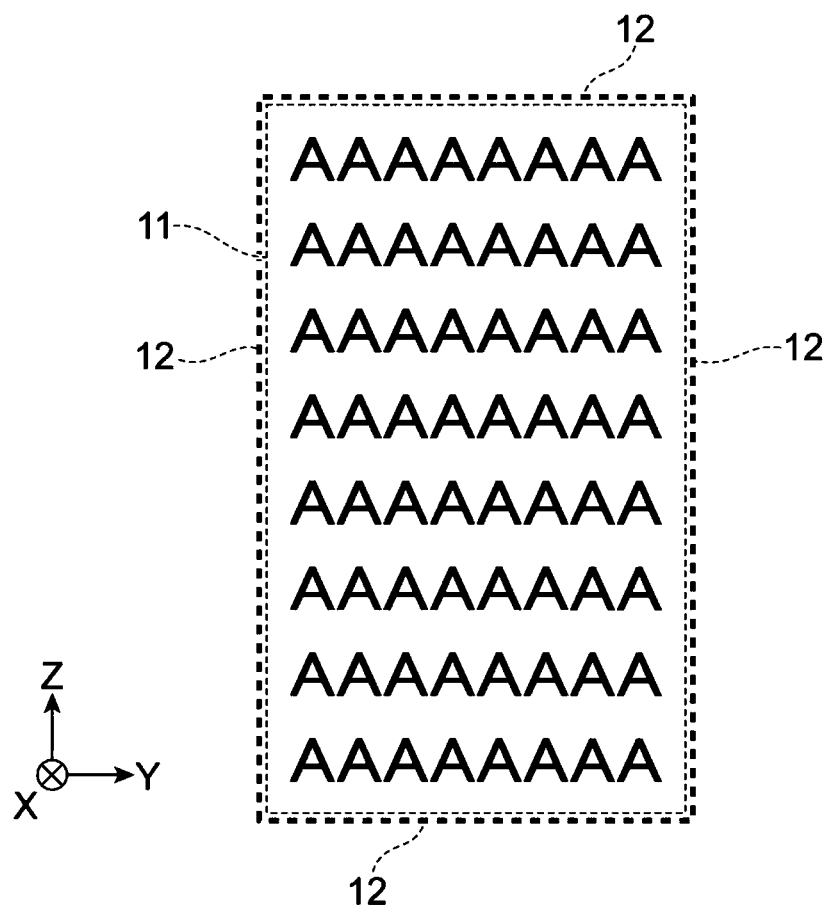
FIG. 29B is a view obtained when the first aerial image is observed from the front.

FIGS. 29A and 29B are diagrams describing another formation example of the aerial image 12 which improves the visibility of the aerial image 11. FIG. 29A is a diagram illustrating the aerial images 11 and 12 viewed in an oblique direction. FIG. 29B is a diagram illustrating the aerial image 11 viewed from the front.

In FIGS. 29A and 29B, four aerial images 12 are formed so as to surround the four sides of the aerial image 11. A color tone or brightness which improves the visibility of the aerial image 11 is selectively used for the aerial image 12.

In FIGS. 29A and 29B, the four aerial images 12 emphasize the fringe of the aerial image 11. As a result, presence of the aerial image 11 viewed as if floating in the air is emphasized, improving the visibility of the aerial image 11.

Fifteenth Formation Example

Figure 30A:
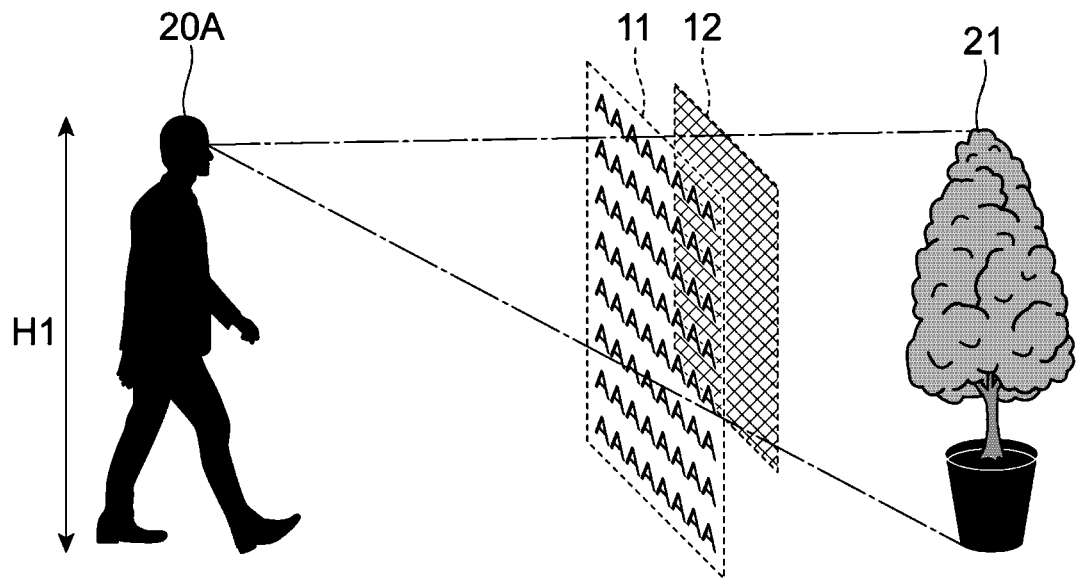
FIG. 30A is a diagram describing an example in which an aerial image is formed in accordance with the height of an observer, and illustrating the case in which the observer is tall.
Figure 30B:
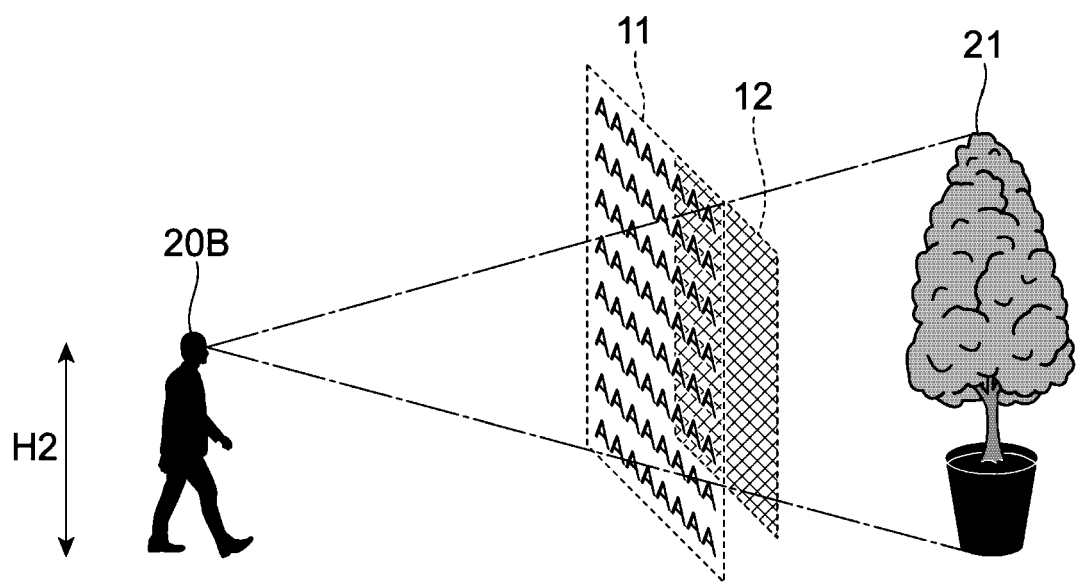
FIG. 30B is a diagram describing an example in which an aerial image is formed in accordance with the height of an observer, and illustrating the case in which the observer is short.

FIGS. 30A and 30B are diagrams describing formation examples of the aerial image 12 in accordance with the height of an observer. FIG. 30A illustrates the case in which the height H1 of the person 20A who is an observer is large. FIG. 30B illustrates the case in which the height H2 of the person 20B who is an observer is small.

Even when the positional relationship between the aerial image 11 and the potted plant 21 is the same, a view of the potted plant 21 located behind in the case where the observer is an adult (for example, the person 20A) is naturally different from that in the case where the observer is a child (for example, the person 20B).

For example, when the observer is an adult, the aerial image 12 is accordingly disposed at a high position in accordance with the height of their eyes. When the observer is a child, the aerial image 12 is accordingly disposed at a low position in accordance with the height of their eyes.

Thus, the aerial image 12 is formed in accordance with the height of an observer, achieving improvement of the observer's visibility of the aerial image 11.

Second Exemplary Embodiment

In the first exemplary embodiment described above, the case in which a different aerial image 12 is formed to improve the visibility of the aerial image 11 is described. In a second exemplary embodiment, a method of improving the visibility by adjusting incident light which causes the visibility of the aerial image 11 to be reduced will be described.

Schematic Configuration of an Aerial Image Forming System

Figure 31:
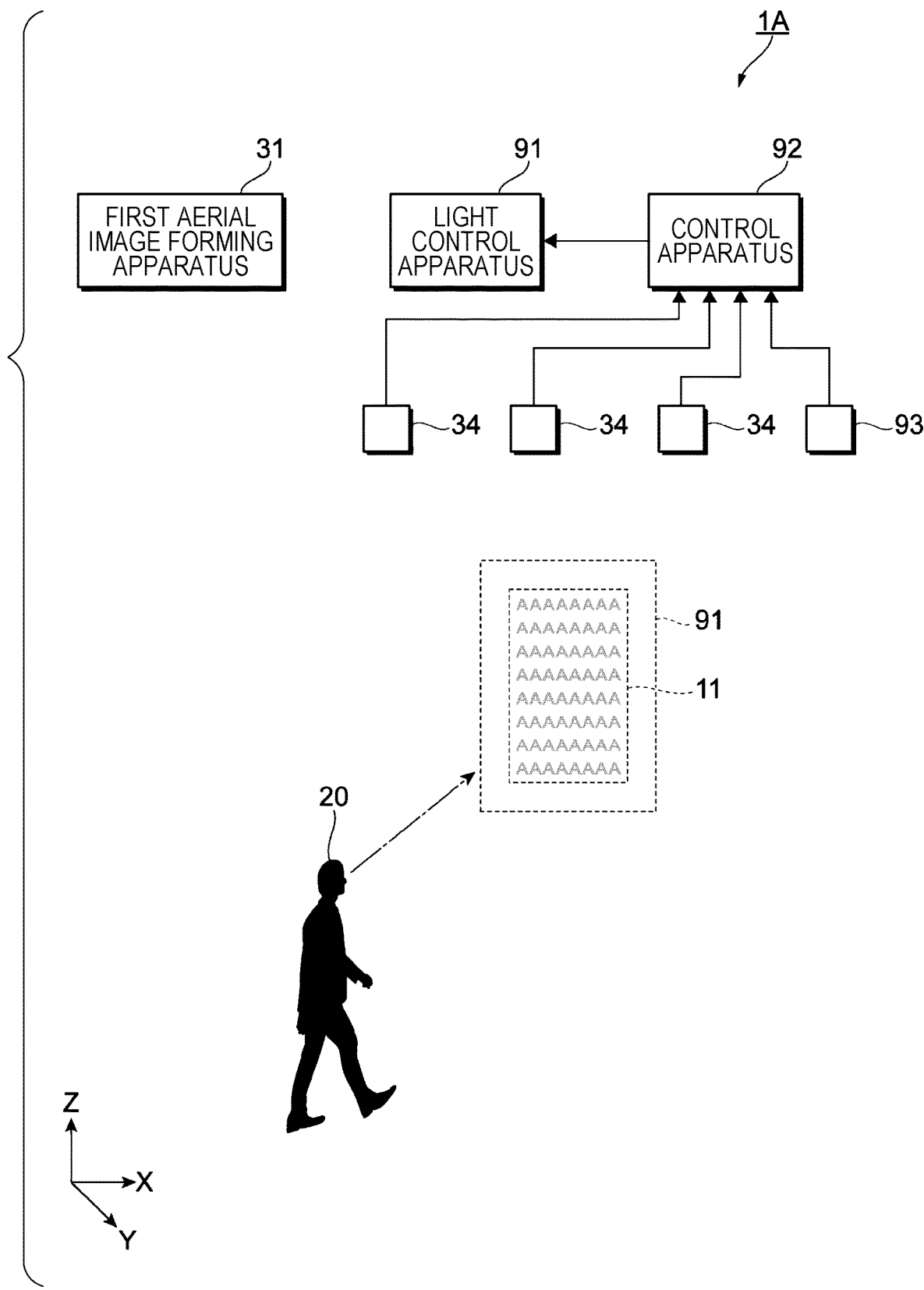
FIG. 31 is a diagram describing the schematic configuration of an aerial image forming system according to a second exemplary embodiment.

FIG. 31 is a diagram describing the schematic configuration of an aerial image forming system 1A according to the second exemplary embodiment.

In FIG. 31, components corresponding to those in FIG. 1 are designated with the corresponding reference numbers.

In the second exemplary embodiment, a mechanism of reducing light (for example, sunlight or light from a streetlamp emitted from the outside of a window, or light from a light source disposed in a room or the like) which causes the visibility of the aerial image 11 to be reduced is employed.

To achieve this, the aerial image forming system 1A includes the aerial image forming apparatus 31, a light control apparatus 91, a control apparatus 92, the human detection sensors 34, and an illuminance sensor 93. The aerial image forming apparatus 31 forms the aerial image 11. The light control apparatus 91 is disposed near the aerial image 11. The control apparatus 92 controls the amount of light transmitted through the light control apparatus 91.

The light control apparatus 91 includes, for example, light control glass. The light control glass has a structure in which, for example, liquid crystal is present between two glass plates. Alternatively, instead of liquid crystal, a functional particle or an emulsion may be used. In FIG. 31, a single light control apparatus 91 is used. Alternatively, multiple light control apparatuses 91 may be used. The light control apparatus 91 is an exemplary light control unit.

The illuminance sensor 93 manages the brightness of an area (for example, the background) around the aerial image 11. In FIG. 31, a single illuminance sensor 93 is used. Alternatively, multiple illuminance sensors 93 may be used.

Figure 32:
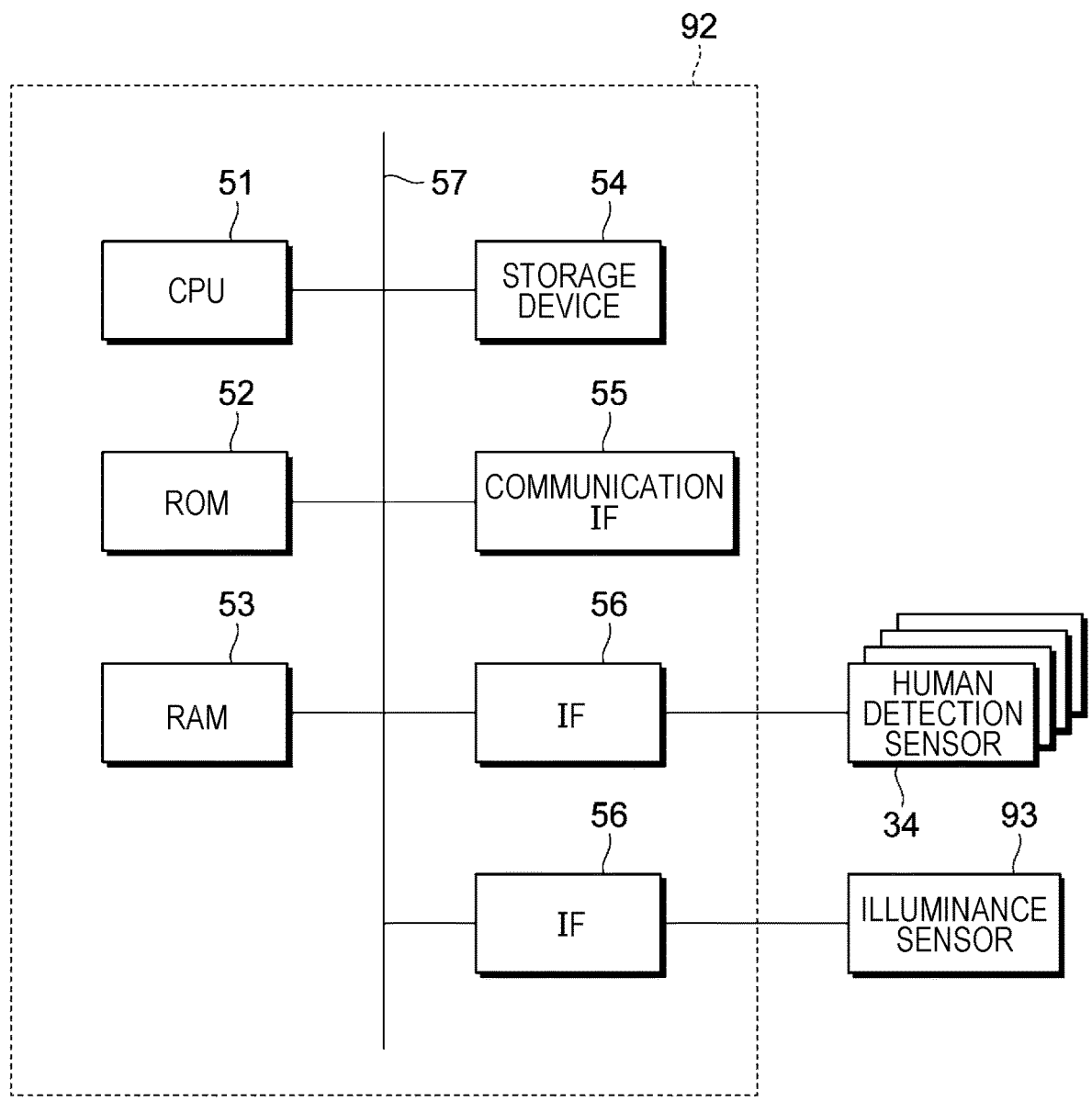
FIG. 32 is a diagram describing an exemplary hardware configuration of a control apparatus.

FIG. 32 is a diagram describing an exemplary hardware configuration of the control apparatus 92.

In FIG. 32, components corresponding to those in FIG. 7 are designated with the corresponding reference numerals.

The control apparatus 92 includes the CPU 51, the ROM 52, the RAM 53, the storage device 54, the communication IF 55, the IFs 56, and the bus 57. The human detection sensors 34 and the illuminance sensor 93 are connected to the control apparatus 92 through the IFs 56.

Figure 33:
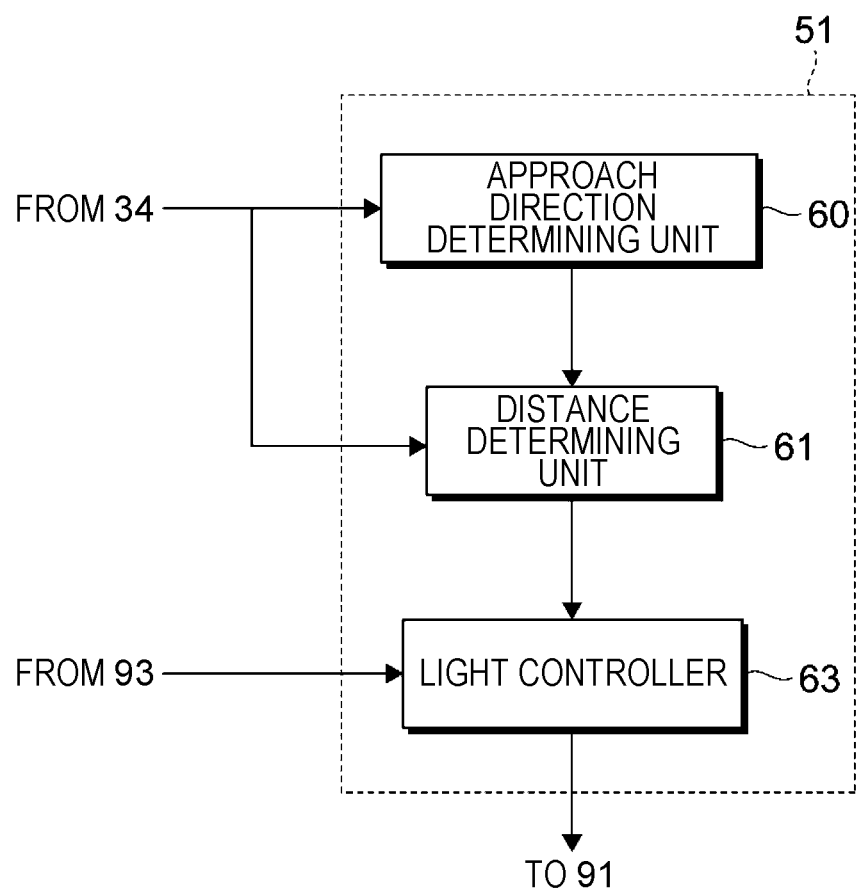
FIG. 33 is a diagram describing an exemplary functional configuration of a control apparatus.

FIG. 33 is a diagram describing an exemplary functional configuration of the control apparatus 92 (see FIG. 32).

The functional configuration in FIG. 33 is implemented through the CPU 51 (see FIG. 32) executing programs.

The CPU 51 functions as the approach direction determining unit 60, the distance determining unit 61, and a light controller 63. The approach direction determining unit 60 determines the direction from which the person 20 (see FIG. 31) approaches the aerial image 11 (see FIG. 31). The distance determining unit 61 determines the distance between the aerial image 11 and the person 20. The light controller 63 controls the transmittance of the light control apparatus 91 on the basis of the determination results of the approach direction and the distance and the brightness determined by the illuminance sensor 93.

The light controller 63 is an exemplary controller.

When an area around the aerial image 11 is bright, the light controller 63 exerts control so that the transmittance of the light control apparatus 91 is reduced in order that the visibility of the aerial image 11 is improved. The transmittance may be adjusted steplessly in accordance with the brightness determined by the illuminance sensor 93, or may be adjusted with several steps.

Figure 34:
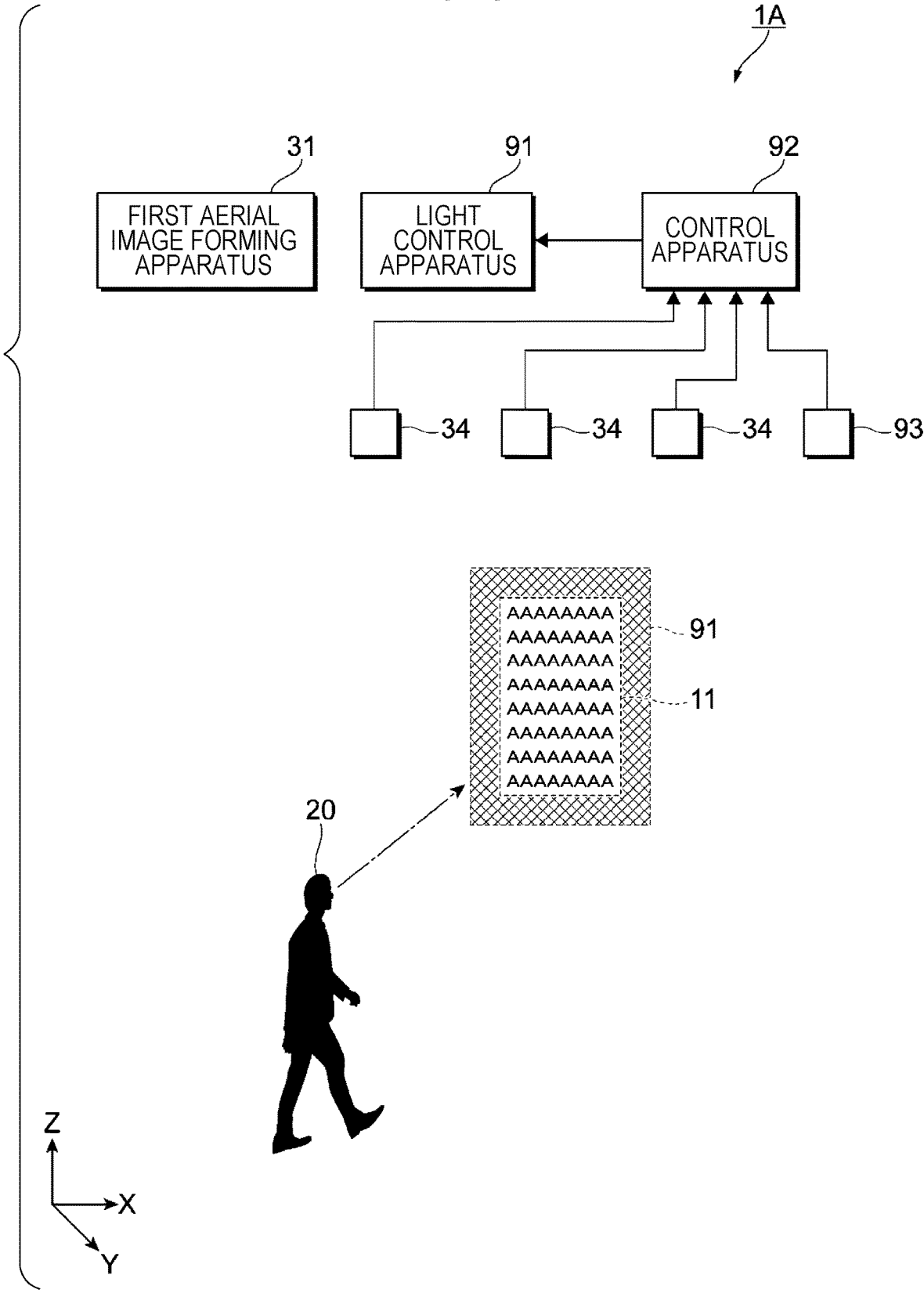
FIG. 34 is a diagram describing an exemplary view of an aerial image obtained when the transmittance of a light control apparatus is reduced.

FIG. 34 is a diagram describing an exemplary view of the aerial image 11 obtained when the transmittance of the light control apparatus 91 is reduced.

In FIG. 34, reduction in the amount of light transmitted through the light control apparatus 91 causes improvement of the visibility of the aerial image 11 located on the near side of the light control apparatus 91.

Third Exemplary Embodiment

Another method of improving the visibility by adjusting incident light which reduces the visibility of the aerial image 11 will be described.

Schematic Configuration of an Aerial Image Forming System

Figure 35:
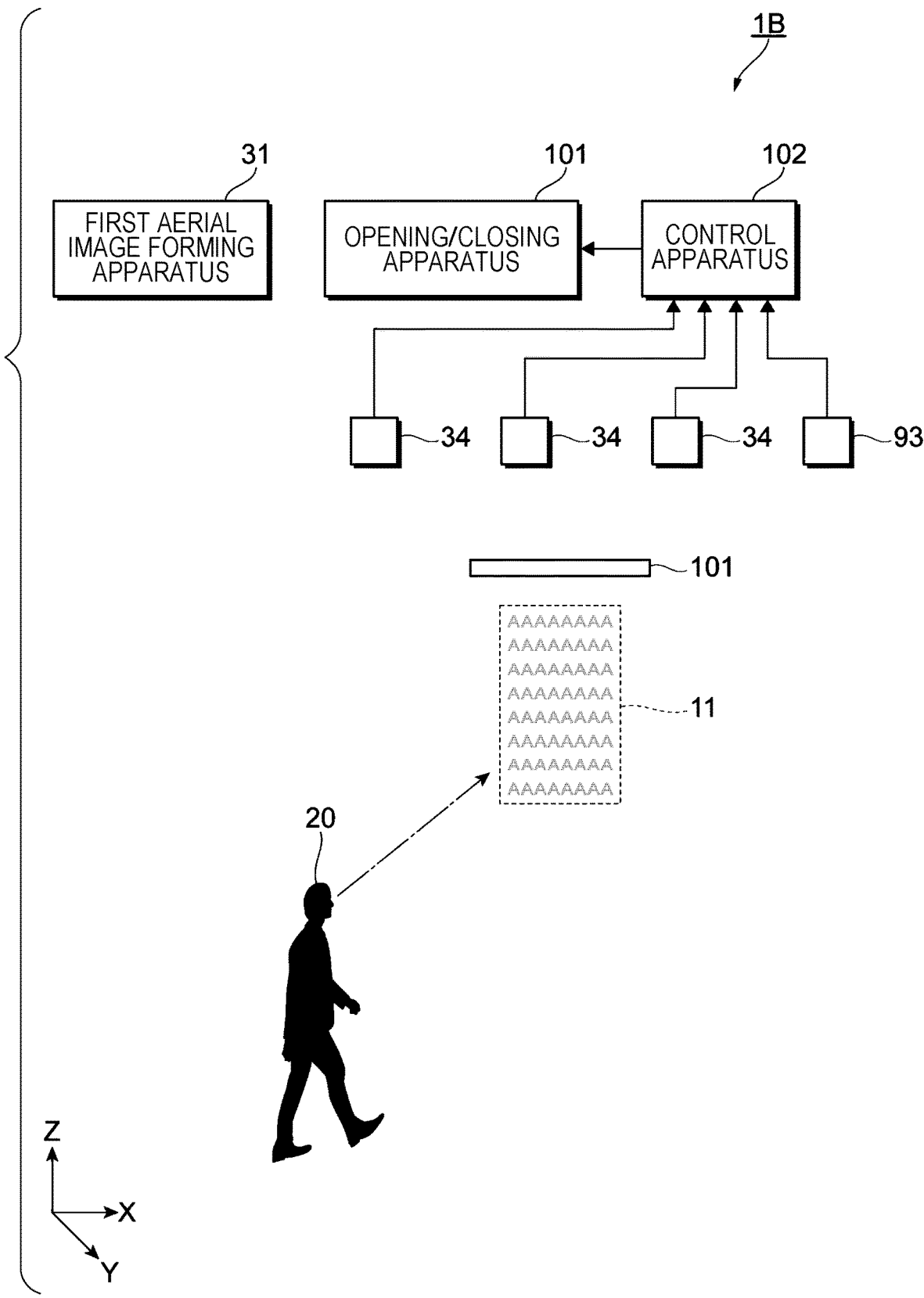
FIG. 35 is a diagram describing the schematic configuration of an aerial image forming system according to a third exemplary embodiment.

FIG. 35 is a diagram describing the schematic configuration of an aerial image forming system 1B according to a third exemplary embodiment.

In FIG. 35, components corresponding to those in FIG. 31 are designated with the corresponding reference numerals.

Also in the third exemplary embodiment, a mechanism of reducing light (for example, sunlight or light from a streetlamp emitted from the outside of a window, or light from a light source disposed in a room or the like) which causes the visibility of the aerial image 11 to be reduced is employed.

The aerial image forming system 1B includes the aerial image forming apparatus 31, an opening/closing apparatus 101, a control apparatus 102, the human detection sensors 34, and the illuminance sensor 93. The aerial image forming apparatus 31 forms the aerial image 11. The opening/closing apparatus 101 is disposed in an area near the aerial image 11. The control apparatus 102 controls the opening/closing apparatus 101.

The opening/closing apparatus 101 has, for example, a mechanism of opening/closing a shutter, a curtain, or the like. The shutter, the curtain, or the like is an exemplary component reducing light. The shutter may be the roller type, or the type of being capable of adjusting the angle of the multiple shutter plates all together, such as a blind shutter.

In FIG. 35, a single opening/closing apparatus 101 is used. Alternatively, multiple opening/closing apparatuses 101 may be used. The opening/closing apparatus 101 is an exemplary light control unit.

Figure 36:
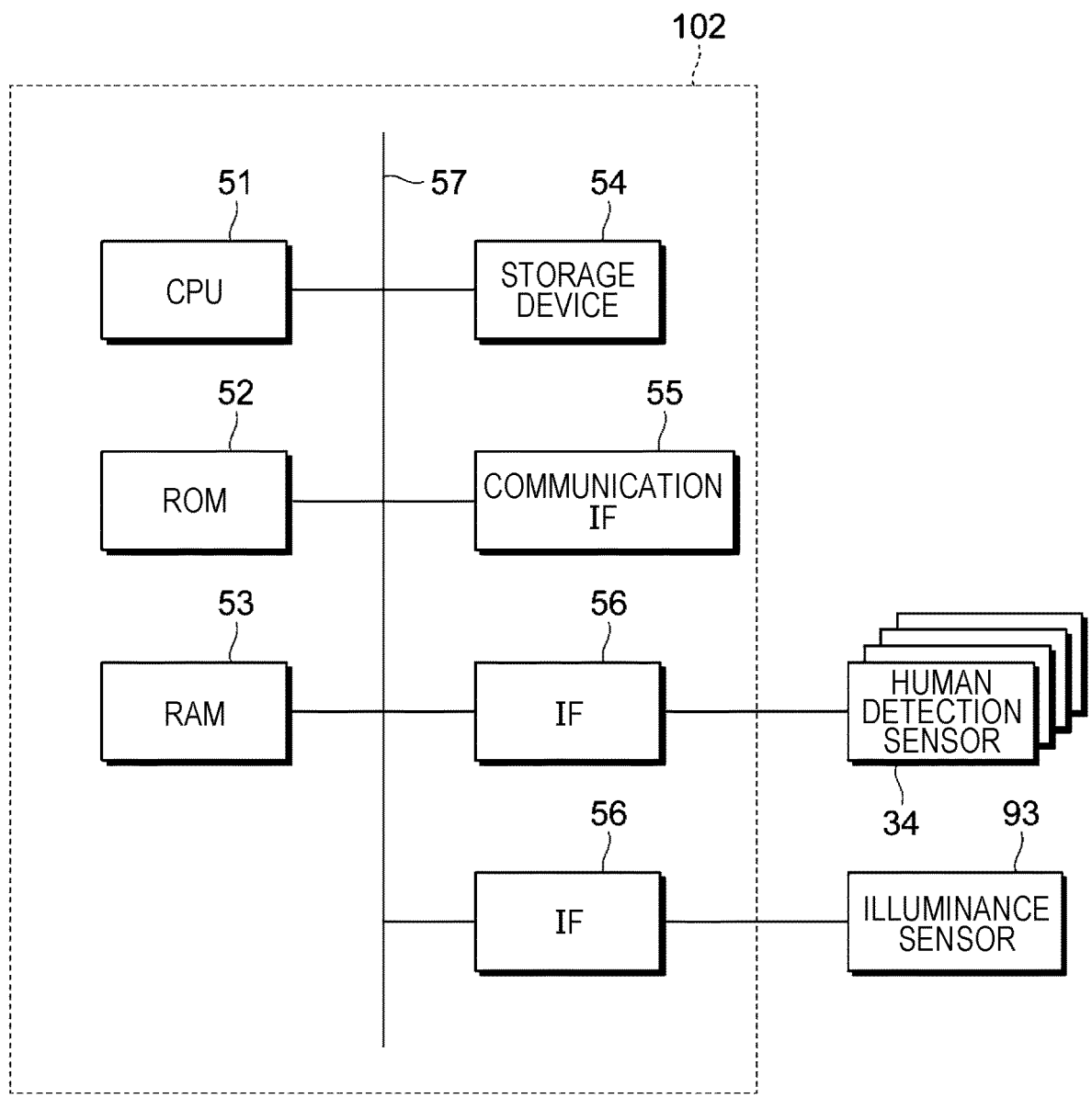
FIG. 36 is a diagram describing an exemplary hardware configuration of a control apparatus.

FIG. 36 is a diagram describing an exemplary hardware configuration of the control apparatus 102.

In FIG. 36, components corresponding to those in FIG. 32 are designated with the corresponding reference numerals.

The configuration of the control apparatus 102 is common to the configuration of the control apparatus 92 according to the second exemplary embodiment.

Figure 37:
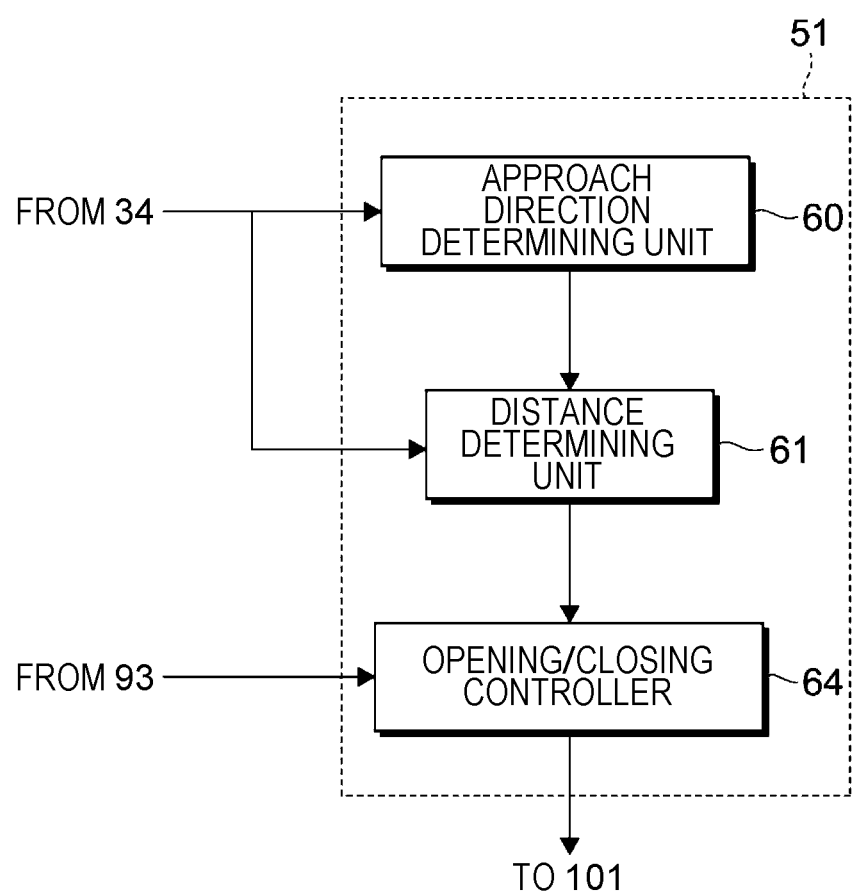
FIG. 37 is a diagram describing an exemplary functional configuration of a control apparatus.

FIG. 37 is a diagram describing an exemplary functional configuration of the control apparatus 102 (see FIG. 36).

The functional configuration in FIG. 37 is implemented through the CPU 51 (see FIG. 36) executing programs.

The CPU 51 functions as the approach direction determining unit 60, the distance determining unit 61, and an opening/closing controller 64. The approach direction determining unit 60 determines the direction from which the person 20 (see FIG. 31) approaches the aerial image 11 (see FIG. 31). The distance determining unit 61 determines the distance between the aerial image 11 and the person 20. The opening/closing controller 64 controls an opening/closing operation of the opening/closing apparatus 101 on the basis of the determination results of the approach direction and the distance and the brightness determined by the illuminance sensor 93.

The opening/closing controller 64 is an exemplary controller.

When an area around the aerial image 11 is bright, the opening/closing controller 64 pulls out the component accommodated in the opening/closing apparatus 101 or controls the angle of a blind shutter so that the visibility of the aerial image 11 is improved.

For example, in the case of a roller shutter, the opening/closing controller 64 controls the opening/closing apparatus 101 so that the shutter is pulled out to a position at which incident light is blocked.

Figure 38:
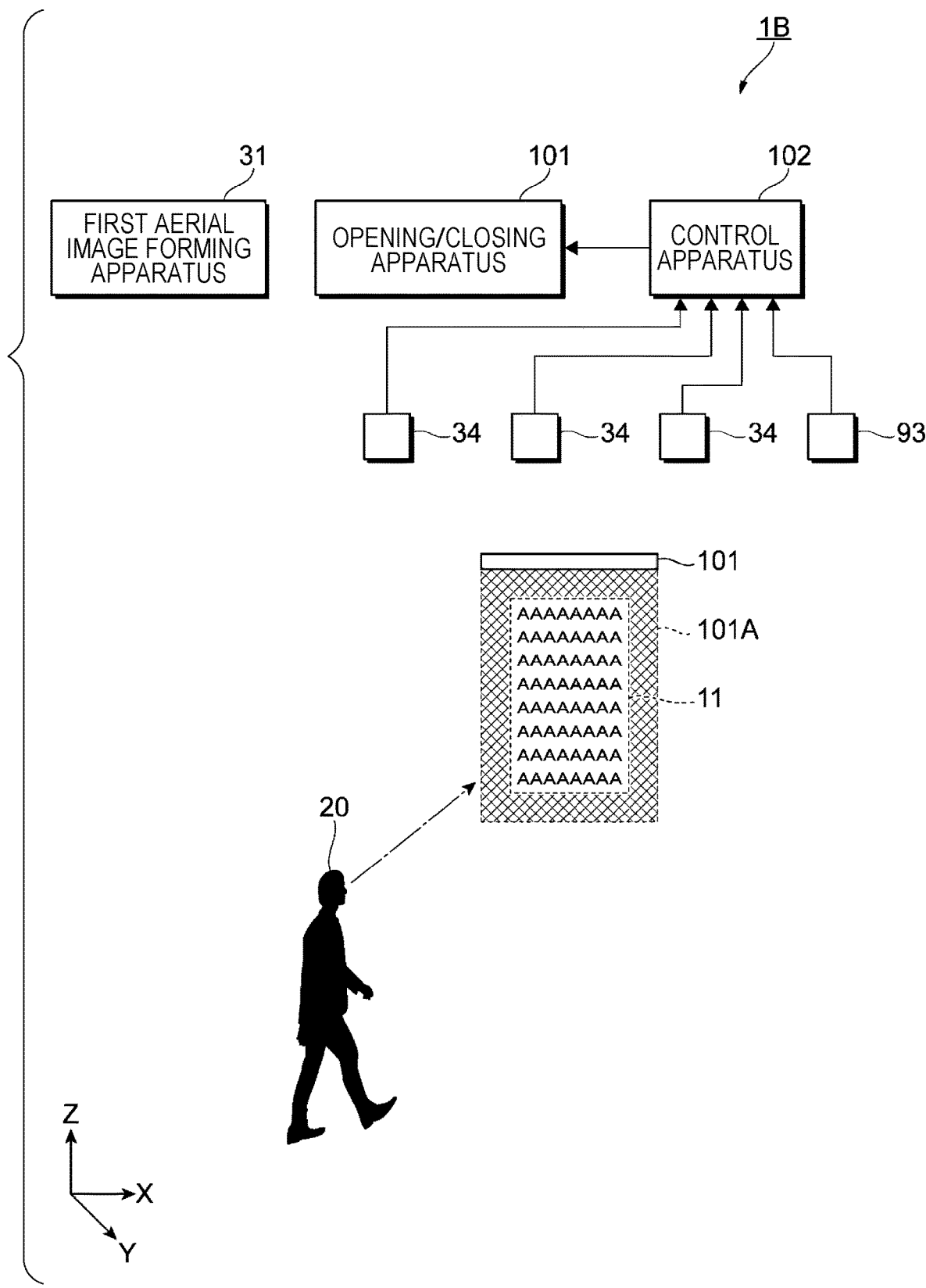
FIG. 38 is a diagram describing a view of an aerial image obtained when a shutter is pulled down from an opening/closing apparatus.

FIG. 38 is a diagram describing a view of the aerial image 11 obtained when a shutter 101A is pulled out from the opening/closing apparatus 101.

In FIG. 38, reduction in incident light transmitted through the aerial image 11 causes improvement of the visibility of the aerial image 11.

Other Exemplary Embodiments

The exemplary embodiments of the present invention are described. The technical scope of the present invention is not limited to the scope described in the above-described exemplary embodiments. It is clear, from the claims, that exemplary embodiments obtained by adding various changes or improvements to the above-described exemplary embodiments are also included in the technical scope of the present invention.

In the first exemplary embodiment described above, the case in which the aerial image 11 is planar is described. However, as in the description about the aerial image forming apparatus 31, the present invention may be applied to the case in which the aerial image 11 is formed three-dimensionally.

Even in this case, the aerial image 12 formed for improvement of the visibility may be planar.

In the first exemplary embodiment described above, the different aerial image 12 is formed behind the aerial image 11 used for display of a guide, an advertisement, or the like, improving the visibility of the aerial image 11 disposed on the near side. Without a precondition of formation of the aerial image 12, the visibility of the aerial image 11 may be improved.

For example, the color tone of an area, in the aerial image 11, in which the visibility is reduced or is likely to be reduced may be changed, or the density or the brightness may be increased, improving the visibility.

As the color tone after the change, for example, an opposite color (complementary color) to a background may be used. The change in the color tone, the density, or the like may be made not only in a partial area in the aerial image 11 but also in the entire aerial image 11.

In the first exemplary embodiment described above, the aerial image 12 is formed in order that the visibility is improved. Alternatively, an image may be formed by using a liquid crystal display or an organic electro-luminescence (EL) display.

What is claimed is:

1. An information processing apparatus comprising:
   a controller configured to determine, based on signals received from one or more sensors, whether a person approaches a first image formed in the air by a first image forming unit;
   an approach direction determining unit configured to determine a direction in which the person approaches the first image based on the signals received from the one or more sensors; and
   a distance determining unit configured to determine a distance between the person and the first image based on the signals received from the one or more sensors,
   wherein
   only in response to both (i) the distance determining unit determining that the distance is less than or equal to a threshold distance and (ii) the approach direction determining unit determining that the person approaches the first image in a predetermined direction, the controller controls a second image forming unit to form a second image in the air between the first image and a background object positioned on an opposite side of the first image from the person, thereby reducing visibility of the background object so as to improve visibility of the first image.

2. The information processing apparatus according to claim 1,
   wherein the controller forms the second image in accordance with the direction in which the person approaches the first image.

3. The information processing apparatus according to claim 2,
   wherein the person is positioned nearer to the first image than a different person.

4. The information processing apparatus according to claim 2,
   wherein the controller changes, in accordance with the direction, a position at which the second image is formed.

5. The information processing apparatus according to claim 2,
   wherein the controller changes a shape of the second image in accordance with the direction.

6. The information processing apparatus according to claim 1,
   wherein the second image is formed in accordance with a portion of the first image in which the visibility is affected.

7. The information processing apparatus according to claim 6,
   wherein the portion is determined on a basis of an image obtained by imaging the first image.

8. The information processing apparatus according to claim 7,
   wherein the second image is formed in accordance with an area satisfying a prespecified condition, the area being included in the first image.

9. The information processing apparatus according to claim 8,
   wherein the condition encompasses one or both of a character area and an image area.

10. The information processing apparatus according to claim 7,
    wherein the portion is determined in accordance with a change in a background with respect to the image.

11. The information processing apparatus according to claim 6,
    wherein the portion is specified by an operator.

12. The information processing apparatus according to claim 1,
    wherein the controller forms the second image in accordance with the distance between the person and the first image.

13. The information processing apparatus according to claim 12,
    wherein the controller changes content of the second image in accordance with the distance.

14. The information processing apparatus according to claim 13,
    wherein, when the person is located in an area predetermined with respect to the first image, the controller forms the second image.

15. The information processing apparatus according to claim 1,
    wherein the second image improves visibility of a fringe of the first image.

16. The information processing apparatus according to claim 15,
    wherein the second image emphasizes the fringe of the first image.

17. The information processing apparatus according to claim 1,
    wherein the second image is an image which increases contrast to the first image.

18. The information processing apparatus according to claim 17,
    wherein the second image is an image whose entirety is filled with a uniform color or a uniform pattern.

19. The information processing apparatus according to claim 1, wherein the controller forms the second image in accordance with a height of the person.

20. The information processing apparatus according to claim 1,
wherein the controller controls a light control unit that adjusts a light amount in an ambient environment of the first image.

21. The information processing apparatus according to claim 20,
wherein the light control unit adjusts the amount of transmitting light.

22. The information processing apparatus according to claim 20,
wherein the light control unit opens/closes a component reducing light.

23. An information processing system comprising:
a first image forming unit that forms a first image in the air;
a second image forming unit that forms a second image in the air; and
a controller configured to
determine, based on signals received from one or more sensors, whether a person approaches the first image,
determine a direction in which the person approaches the first image based on the signals received from the one or more sensors,
determine a distance between the person and the first image based on the signals received from the one or more sensors, and
only in response to both (i) the distance being less than or equal to a threshold distance and (ii) the person approaching the first image in a predetermined direction, control the second image forming unit to form the second image between the first image and a background object positioned on an opposite side of the first image from the person, thereby reducing visibility of the background object so as to improve visibility of the first image.

24. An information processing system comprising:
a first image forming unit that forms a first image in the air;
a light control unit that adjusts a light amount in an ambient environment of the first image;
an illuminance sensor that senses brightness of the ambient environment; and
a controller configured to
determine, based on signals received from one or more other sensors, whether a person approaches the first image,
determine a direction in which the person approaches the first image based on the signals received from the one or more other sensors,
determine a distance between the person and the first image based on the signals received from the one or more other sensors, and
based on a determination of the direction and a determination of the distance, and in response to the illuminance sensor sensing a first level of brightness, control an operation of the light control unit to reduce transmittance of the light control unit so as to improve visibility of the first image.

25. A non-transitory computer readable medium storing a program causing a computer to execute a process comprising:
determining, based on signals received from one or more sensors, whether a person approaches a first image formed in the air by a first image forming unit;
determining a direction in which the person approaches the first image based on the signals received from the one or more sensors;
determining a distance between the person and the first image based on the signals received from the one or more sensors; and
only in response to both (i) the distance being less than or equal to a threshold distance and (ii) the person approaching the first image in a predetermined direction, controlling a second image forming unit to form a second image in the air between the first image and a background object positioned on an opposite side of the first image from the person, thereby reducing visibility of the background object so as to improve visibility of the first image.

* * * * *